(12) United States Patent
Hofmann et al.

(10) Patent No.: US 10,977,593 B1
(45) Date of Patent: *Apr. 13, 2021

(54) PREDICTIVE MODELS FOR ELECTRIC POWER GRID MAINTENANCE

(71) Applicant: American Public Power Association Inc., Arlington, VA (US)

(72) Inventors: Alexander Hofmann, Silver Spring, MD (US); Michael John Hyland, Huntingtown, MD (US)

(73) Assignee: American Public Power Association Inc., Arlington, VA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/601,519

(22) Filed: Oct. 14, 2019

Related U.S. Application Data

(63) Continuation of application No. 15/921,917, filed on Mar. 15, 2018, now Pat. No. 10,445,673.

(51) Int. Cl.
*G06N 20/00* (2019.01)
*G06Q 10/06* (2012.01)
(Continued)

(52) U.S. Cl.
CPC ... *G06Q 10/06315* (2013.01); *G06F 11/3447* (2013.01); *G06N 3/08* (2013.01); *G06N 20/00* (2019.01); *G06Q 50/06* (2013.01)

(58) Field of Classification Search
CPC ......... G06Q 10/0635; G06Q 10/06315; G06Q 50/06; G06F 11/3447; G06N 3/08; G06N 99/005

See application file for complete search history.

(56) References Cited

U.S. PATENT DOCUMENTS 7,457,763 B1  11/2008  Garrow
8,682,623 B1  3/2014  Domijan et al.
(Continued)

OTHER PUBLICATIONS

"Major Event Normalization," Working Group on System Design, IEEE Power Engineering Society, Oct. 29, 2001, Retreived from the Internet: <URL: http://grouper.ieee.org/groups/td/dist/sd/doc/2002-08-WhitePaperMajorEvent.pdf>, 8 pages.
(Continued)

*Primary Examiner* — Kamran Afshar
*Assistant Examiner* — Ying Yu Chen
(74) *Attorney, Agent, or Firm* — Fish & Richardson P.C.

(57) ABSTRACT

Methods, systems, and apparatus, including computer-readable storage devices, for predictive models for electric power grid maintenance. In some implementations, one or more computers receive data indicating a maintenance action to be performed for a utility system. The one or more computers generate outcome scores for the maintenance action using a model generated from records for maintenance performed by multiple utilities. The one or more computers select one or more maintenance plan elements based on the outcome scores, provide an indication of the selected one or more maintenance plan elements for display, and store a record corresponding to the maintenance action. In some examples, the selected one or more maintenance plan elements can include recommended plan elements to improve the safety and efficiency of the maintenance action.

22 Claims, 10 Drawing Sheets

(51) Int. Cl.
  *G06Q 50/06* (2012.01)
  *G06F 11/34* (2006.01)
  *G06N 3/08* (2006.01)

(56) References Cited

U.S. PATENT DOCUMENTS

| | | | |
|---|---|---|---|
| 8,799,042 | B2 | 8/2014 | Hampapur |
| 9,297,723 | B1 | 3/2016 | Hofmann et al. |
| 2011/0066898 | A1* | 3/2011 | McRory ............... G06F 11/008 714/47.3 |
| 2012/0007707 | A1 | 1/2012 | Matai |
| 2012/0150460 | A1 | 6/2012 | Balcerek et al. |
| 2012/0173296 | A1 | 7/2012 | McMullin |
| 2013/0198847 | A1 | 8/2013 | Sampigethaya |
| 2014/0012941 | A1 | 1/2014 | Smith et al. |
| 2014/0081998 | A1 | 3/2014 | Fan et al. |
| 2014/0129919 | A1 | 5/2014 | Benson |
| 2014/0257913 | A1 | 9/2014 | Ball et al. |
| 2014/0350989 | A1 | 11/2014 | Telatar |
| 2014/0365191 | A1 | 12/2014 | Zyglowicz |
| 2016/0092808 | A1 | 3/2016 | Cheng |
| 2017/0147958 | A1 | 5/2017 | Hatfield |
| 2017/0206510 | A1 | 7/2017 | Horton |
| 2017/0308802 | A1 | 10/2017 | Ramsoy |
| 2019/0114573 | A1 | 4/2019 | Moore |

OTHER PUBLICATIONS

"Major Event/Abnormal/Normal Event Definition," IEEE, Mar. 12, 2002. Retreived from the Internet: <URL: http:I/ grouper. ieee.org/groups/td/d ist/sd/doc/2002-03-webex.pdf>, 9 pages.

"Progress Energy Carolinas Response to NCUC & Public Staff Data Request No. 1, Dec. 4-13, 2002 Ice Storm, Jan. 15, 2003" Jul. 10, 2008. Retrieved from the Internet: <URL: http://grouper.ieee.org/groups/td/dist/sd/doc/2003-01-Ice-Storm-Data-Request.pdf>, 34 pages.

Agüero and Xu, "Predictive Distribution Reliability Practice Survey Results," Jan. 14, 2014. Retrieved from the Internet: <URL: http://grouper.ieee.org/groups/td/dist/sd/doc/2014-01%20Predictive%20Distribution%20Reliabilty%20Practice %20Survey%20Results.pdf>, 15 pages.

Angalakudati et al., "Improving Emergency Storm Planning using Machine Learning," Draft of paper for T&D Conference and Exposition, 2014 IEEE PES, 6 pages, Dec. 2012.

Ballijepalli et al., "Predicting Distribution System Performance against Reliability Standards," Sep. 2, 2003. Retrieved from the Internet: <URL: http://grouper.ieee.org/groups/td/dist/sd/doc/2003-09-RegCritPESGM03RichChristie.pdf> 27 pages.

Brown, Richard. Electric Power Distribution Reliability Second Edition. CRC Press, 2009, pages.

Christie et al., "P1366 Major Event Day Language Draft 2.5 Beta Method," Aug. 12, 2002. Retrieved from the Internet: <URL: http://grouper.ieee.org/groups/td/dist/sd/doc/2002-08-P1366MajorEventDayLanguageDraft4.pdf>, 6 pages.

Eto, "Trends in Major Events Days over Time," Jan. 13, 2015. Retrieved from the Internet: <URL:http://grouper. ieee.org/groups/td/dist/sd/doc/2015-01%20Trends%20in%20Major%20Events%20over20time%20-Joseph%20Eto.pdf>, 12 pages.

Hann et al., "Investigation of the 2.5 Beta Methodology," IEEE Transactions on Power Systems, 26(4):2577-2578, Nov. 2011.

National Safety Council, Alliance, "Near Miss Reporting Systems," Mar. 28, 2018. Retrieved from the Internet:<URL:https://en.wikipedia.org/wiki/Near_miss_(safety), 3 pages.

Rudin, Cynthia "Machine Learning for the New York City Power Grid"., IEEE Transactions on Pattern Analysis and Machine Intelligence, vol. 34, No. 2, Feb. 2012.

T. Rivas, M. Paz, J.E. Martin, J.M. Matias, J.F.Garcia, and J.Taboada, "Explaining and predicting workplace accidents using data-mining techniques", Mar. 10, 2011, Reliability Engineering and System Safety 96 (2011 ), pp. 739-747. (Year: 2011).

US Energy Information Administration, Today in Energy Electricity restored to many in the Northeast but outages persist Nov. 9, 2012.

Warren et al., "Classification of Major Event Days," Jan. 22, 2003. Retrieved from the Internet: <URL: http://grouper.ieee.org/groups/td/dist/sd/doc/2003-01-Major-Events-Classification-v3.pdf>, 6 pages.

Warren et al., "Descriptions of Candidate Major Event Day Classification Methods," Feb. 8, 2002. Retrieved from the Internet: <URL: http://grouper.ieee.org/groups/td/dist/sd/doc/2002-02-DescribedThreeBeta.doc>, 4 pages.

Warren, "Simplified Explanation of the Three-Beta Method," Feb. 19, 2002. Retrieved from the Internet <URL: http://grouper.ieee.org/groups/td/dist/sd/doc/2002-02-SimplifiedThreeBeta.doc>, 2 pages.

Waters, C. and Lawton, C. (2011) Red Squirrel Translocation in Ireland. Irish Wildlife Manuals, No. 51. National Parks and Wildlife Service, Department of the Environment, Heritage and Local Government, Dublin, Ireland.

Weiwei Wu, Alistair G.F. Gibb, and Qiming Li, "Accident precursors and near misses on construction sites: An investigative tool to derive information from accident databases", 2010, Safety Science 48 (2010), p. 845-858. (Year: 2010).

Wikipedia, "Near miss (safety)," Mar. 29, 2018. Retrieved from the Internet:<URL:https://en.wikipedia.org/wiki/Near_miss_(safety), 6 pages.

Williams, "Update on IEEE 1366: Major Event Definition," Working Group on System Design, IEEE, Oct. 29, 2001. Retrieved from the Internet: <URL: http://grouper.ieee.org/groups/td/dist/sd/doc/2001-10-majorevent.pdf>, 25 pages.

Xu, "Predictive Reliability Study," Jan. 15, 2013. Retrieved from the Internet: <URL: http://grouper.ieee.org/groups/td/dist/sd/doc/2013-01%20Predictive%20Reliability%20Study.pdf>, 15 pages.

\* cited by examiner

FIG. 3

Incident #10908

Utility: ABC Power
Date of Event: 03/15/2017  Time of Event: 8:00 AM
Date Reported: 03/16/2017  Time Reported: 12:30 PM
Location: 1234 Safety Drive.

Type of Maintenance: Repair transformer

Weather or environmental conditions when incident occurred

[Use NOAA Data] [Temperature ▼] [Precipitation ▼] [Wind Speed ▼]

Records for this incident

| Edit | Del | Employee Name | Record Type | Record Count | Status |
|---|---|---|---|---|---|
| ✎ | ✗ | John | Injury | 2 | Pending |
| ✎ | ✗ | Jerry | Fatality | 1 | Complete |
| ✎ | ✗ | Sarah | Near miss | 1 | Complete |
| ✎ | ✗ |  | Equipment Damage | 1 |  |
| ✎ | ✗ |  | Investigation Report | 1 |  |

[Create New Record]

Safety Tracker https://safetypublicpower.org/record/incident

| Safety | Home | Meetings/ Briefings | Incidents | Reports | Manage | | User Profile |

Modifications soon go here.

| Record Incident | Record Near-Miss | Investigation | Events | Export |

Incident #10908, Near Miss at 1234 Safety Drive on 3/15/2017

Basic Information

Reportable? ☑ Yes ☐ No

* Date of event: 03/15/2017    Time of Event: 8:00 AM — 601
* Date reported: 03/16/2017    Time reported: 12:30 PM — 602

* Employee(s) nearly affected: Sarah — 603

* Address/Location: 1234 Safety Drive
    Use my location — 608
604

Was proper personal protective equipment (PPE) worn?
☑ Yes ☐ No    If no, please explain: [_____] — 605

Were all proper procedures followed?
☑ Yes ☐ No    If no, please explain: [_____]

FIG. 6A

Near-Miss Description

Use the sentence generator options below to describe the details of this near-miss:

Employee Name 1 nearly [What happened? Select One: fell / tripped / strained / inhaled / was exposed to / was injured by / was burned by / was hit by / was bitten by / was attacked by / other] [Select One: from pole / from ladder / from repair bucket / on equipment / live wire / electrified area / chemicals / fumes / sharp tools or materials / heavy tools or equipment / falling tree/branch / falling utility pole / falling heavy tools or equipment / excessive heat / insect / other animal / other] while [How? Select One: Repairing equipment / Handling equipment / Driving to/from a job site / Walking to/from a job site / Carrying/lifting materials / Present but not working at a job site / Other] [If equipment involved, which type? Select One: transformer / transmission line / multimeter / generator] — 620 in/at the [Where? Select One: Generation Station / Substation / Distribution Line / Transmission Line / Underground Line / Office Area / Loading Dock / Basement / Other] at [Substation 5] [Circuit 1]

If other, please explain. — 630

[+] Add rows

FIG. 6B

PREDICTIVE MODELS FOR ELECTRIC POWER GRID MAINTENANCE

CROSS-REFERENCE TO RELATED APPLICATION

This application is a continuation of U.S. patent application Ser. No. 15/921,917, filed on Mar. 15, 2019, the entire contents of which is incorporated by reference herein.

TECHNICAL FIELD

This disclosure relates to predictive models for electric power grid maintenance.

BACKGROUND

From time to time, employees of utilities may perform routine or emergency maintenance actions on an electrical power grid. The types of work being performed, physical fitness of the personnel for the work, hazard exposure, environmental conditions, and procedures used to perform the maintenance can greatly affect a worker's safety and effectiveness when performing maintenance.

SUMMARY

Electric power grids regularly require maintenance, e.g., to replace or repair infrastructure, restore service, or otherwise maintain safe and operable conditions. To increase the likelihood that maintenance actions are safe and successful, a computing system can train machine learning models to predict the outcomes of planned future maintenance actions. Using the outputs of the models, the computing system can identify specific maintenance plan elements, e.g., certain types of equipment to use or certain procedures to carry out, which can increase the likelihood that the particular maintenance action will achieve its purpose and avoid harm to a person or damage to property. The machine learning models can be trained from examples acquired through tracking of maintenance actions attempted by one or more different electric power utilities, contractors, or other organizations. The tracking data may indicate, for example, information describing the maintenance plans created, the actual actions taken, and the outcomes of the maintenance, including any harm or damage that occurred or was narrowly avoided (e.g., a near miss). With this information, the training process can generate models that can predict outcomes of future maintenance with high accuracy.

The outputs of the trained models can be probability scores or other scores indicating likelihoods of certain potential outcomes. The computing system can use these scores to identify the factors most critical to the success of a particular planned maintenance action. The computing system can then map those factors to maintenance plan elements that can increase the likelihood of success. These maintenance plan elements can be added to the maintenance plan or recommended to a worker, for example, in a user interface in which the user is currently entering or generating the maintenance plan.

For example, the model can use, among other inputs, data indicating a specific type of equipment failure to be corrected, the geographic location, the technique planned for a repair, and the forecasted weather for the planned time and date of the repair. Other factors that may be used include the training level of the specific workers assigned to complete the repair, the outcomes of maintenance performed by those workers, the types of equipment to be used, the safety precautions noted in or omitted from the maintenance plan, and the relative success of similar maintenance performed by other utility organizations under similar conditions. From these inputs, the models can infer the factors most likely to impede successful maintenance, e.g., an inability to reach a safe working position and a resulting risk of electrocution, over exposure to electrical or structural hazards, lack of sufficient training, and unsafe environmental conditions, such as a temperature at the job-site that exceeds a particular threshold for safe working conditions. In response, based on output scores of the models, the computing system can evaluate potential changes to the maintenance plan that would address the potential obstacles. The computing system can issue warnings and recommend changes, such as using a certain class of bucket truck to reach needed heights and using particular items of protective gear to reduce the risk of electrocution for the job being performed. The mappings between maintenance plan elements—which can include work conditions, exposure hazards, and worker capabilities—and the different outcomes of maintenance attempts can be learned from the tracking data for past maintenance to ensure that maintenance plan elements appropriately mitigate the challenges with which they are associated.

In some implementations, the disclosed systems and techniques include a method performed by one or more computers. The method includes receiving maintenance data indicating a maintenance action to be performed for a utility system; obtaining data indicating (i) a location for the maintenance action and (ii) environmental conditions at the location; and generating outcome scores for the maintenance action using a model generated from records for maintenance performed by multiple utilities, at least one of which serves a geographic region that includes the location for the maintenance action. The utility system can be, for example, an electric power delivery system, a municipal water system, a gas distribution system, a telecommunications system, a transit system, or another system relating to shared infrastructure. The utility can be any organization that performs maintenance actions on the utility system, including an electric power utility company, another utility company, a contractor or subcontractor, or a municipal organization. The outcome scores include a score for each of multiple types of potential outcomes of the maintenance action. The method also includes accessing mapping data indicating a mapping of the multiple types of potential outcomes with a plurality of maintenance plan elements, where the maintenance plan elements include multiple different types of equipment and multiple different procedures; selecting one or more maintenance plan elements based on the outcome scores generated using the model and the mapping data; providing to a client device over a communication network an indication of the selected one or more maintenance plan elements for display on a user interface of the client device; and storing a record corresponding to the maintenance action to specify at least one of the one or more maintenance plan elements.

In some implementations, generating the outcome scores comprises (i) providing data indicating a maintenance type, the location for the maintenance action, and the environmental conditions as input to a machine learning classifier trained based on records of harm resulting from maintenance performed for a utility associated with the maintenance action and one or more other utilities in a particular geographic region and (ii) generating the outcome scores based on the outputs of the machine learning classifier. In some implementations, the machine learning classifier includes at least a neural network, a maximum entropy classifier, a decision tree, a support vector machine, a regression model, or a log-linear model.

In some implementations, the method further includes providing, over the communication network, data for an interactive user interface to receive maintenance plan information, where the interactive user interface includes input controls for specifying characteristics of planned maintenance including a location for the maintenance action, a type of maintenance to be performed, a particular worker assigned to perform the maintenance action, and a technique for carrying out the maintenance action. Here, receiving the maintenance data can include receiving, over the communication network, maintenance data indicating characteristics of a planned maintenance action indicated through user input to the input controls of the interactive user interface.

In some implementations, providing the indication of the selected one or more maintenance plan elements includes providing a recommendation, for display on the interactive user interface for entering the maintenance plan, to add the selected one or more maintenance plan elements to the maintenance plan.

In some implementations, the method further includes (i) accessing data identifying one or more client devices associated with workers carrying out the maintenance action and (2) determining that a particular client device of the one or more client devices is located at the location for the maintenance action. Here, providing the indication of the selected one or more maintenance plan elements can include providing data causing a recommendation for the one or more maintenance plan elements to be output by the particular client device, while the particular client device is located at the location, in response to determining that the particular client device of the one or more client devices is located at the location for the maintenance action.

In some implementations, generating the outcome scores for the maintenance action is further based on data indicating one or more of (i) a malfunction or disruption of the utility system to be addressed with the maintenance action, (ii) equipment of the utility system involved in the maintenance action, (iii) a tool used to perform the maintenance action, (iv) an indication of a planned technique for carrying out the maintenance action, (v) an identifier for a utility associated with the utility system, (vi) an identifier for a worker associated with the maintenance action, or (vii) a level of training of a worker associated with the maintenance action.

In some implementations, generating the outcome scores includes generating multiple outcome scores that each indicate a likelihood of a different type of accident or type of harm to equipment or people given a type of maintenance to be performed, the location for the maintenance action, and the environmental conditions at the location.

In some implementations, the method also includes providing, for display by the client device, an indication of one or more types of harm determined to be most likely according to the outcome scores.

In some implementations, the maintenance data identifies a particular worker assigned to perform the maintenance action. For example, the method can include retrieving information indicating a training level of the particular worker, an incident history of the particular worker, or a health status of the particular worker; and the outcome scores are generated based on the training level of the particular worker, the incident history of the particular worker or the health status of the particular worker. In some cases, the outcome scores are based on maintenance data from similarly situated (e.g., similar training level, similar incident history, or similar health status) workers. For example, if the particular assigned worker has not previously performed the type of work required in the maintenance action, the computer can generate outcome scores based on data from similarly trained workers who have performed that type of work.

In some implementations, the maintenance data indicates that the maintenance action involves repair or replacement of equipment at a generation station, a substation, a distribution line, a transmission line, a metering site, an underground vault, or an underground line, and the data indicating environmental conditions include weather data indicating current weather at the location or forecasted weather for the location at a scheduled or expected time for the maintenance action.

In some implementations, the maintenance plan elements include at least one of (i) a change in personnel for performing the maintenance action, (ii) a change in a time to perform the maintenance action, (iii) a technique for performing the maintenance action (iv) a tool to use to perform the maintenance action, or (iv) safety equipment to use in performing the maintenance action.

In some implementations, the model is generated from a database comprising (i) reports of injuries or damage occurring due to maintenance of utility systems and (ii) reports of near miss events that did not result in injury or damage but had the potential to cause injury or damage.

In some implementations, the method also includes (i) providing interface data for an interactive reporting interface for reporting an incident, where the interactive reporting interface includes a representation of a body of a person, the representation having areas that are selectable by a user to indicate locations of injury to a person, (ii) receiving, over the communication network, report data entered through the interactive reporting interface, the report data describing an accident involving harm to a person and indicating a selected portion of the representation (iii) storing the report data in a database of incident data describing injuries associated with a plurality of electrical power utilities, and (iv) using the report data to generate or update the model for generating outcome scores.

In some implementations, the method includes, after storing the record indicating the maintenance plan, (i) determining that environmental conditions associated with the location for the maintenance action have changed or the health status of the particular worker has changed, (ii) generating additional outcome scores based on data indicating the changed environmental conditions or the changed health status of the particular worker, (iii) altering the maintenance plan based on the additional outcome scores and the mapping data, and (iv) providing a notification of the alteration to the maintenance plan to a client device of a person associated with the maintenance plan.

In some implementations, the method also includes selecting equipment for carrying out the maintenance action based on the outcome scores and reserving, or dispatching, the selected equipment for carrying out the maintenance action and updating the stored record corresponding to the maintenance plan to indicate that reservation or dispatch of the selected equipment.

These general and specific techniques may be implemented using a system, a method, a non-transitory computer readable media, a computer program, or any combination of systems, methods, media, and programs. For example, the techniques can be implemented using one or more non-transitory computer-readable media storing instructions that, when executed by one or more computers cause those computers to perform the described actions.

Implementations may provide one or more of the following advantages. For example, the effectiveness of electrical power grid or other utility system maintenance actions can be increased. The effectiveness may be improved in any of several different aspects, such as increased rates of successful completion of maintenance, reduced time to achieve completion of maintenance, increases in reliability and service life of equipment, reduction in or avoidance of damage to equipment and infrastructure, reduction in injury or harm to personnel, and/or other improvements. These benefits can be achieved through the use of machine learning models trained on tracking data that shows the outcomes of previous maintenance attempts. The trained models can predict various outcomes of a planned maintenance action, including potential risks of damage or harm. Using the output of the machine learning models, a computing system can automatically evaluate and select changes to the maintenance plan to recommend before work begins (e.g., for a job-site briefing) or as work is being performed (e.g., update the plan as work progresses). The selected changes to the maintenance plan can include, for example, recommendations to use certain equipment or techniques; to change the assigned personnel, date and time for maintenance; or to change other plan details. Thus, a computing system can enhance and improve a maintenance plan to increase the likelihood of success, even providing recommendations for the changes while users are creating or reviewing the maintenance plan, or updating the plan as work is performed. Because the models can be trained using data about actual outcomes of prior maintenance, the relationships between risks, conditions (e.g., weather, location, equipment involved, maintenance types, personnel training levels, prior history, etc.), and maintenance plan elements—including the effects of different combinations of conditions, elements, and personnel—can be learned by the models with a high degree of accuracy.

As additional advantages, the success of maintenance actions can be further enhanced through real-time notifications sent to devices of personnel carrying out maintenance. As maintenance proceeds, the computing system can monitor the progress and direct preventative or remedial measures amongst multiple organizations. For example, the computing system can identify specific devices or users involved in a planned maintenance action, and then send customized reminders or warnings when certain conditions occur, e.g., when a device reaches a predetermined location for the maintenance, when a certain step in the maintenance plan is reached, when the computing system determines that a piece of equipment or a step of the maintenance plan is omitted, when the type of work being performed and the safety equipment selected do not match, etc. Further, a computing system can dynamically and automatically adapt maintenance plans to adjust for changing conditions, based on the output of trained machine learning models. For example, as weather conditions change, or as additional details about electrical infrastructure are discovered on-site, the computing system can generate new model outputs to use in automatically re-evaluating and updating the maintenance plan. The computing system can evaluate historic safety performance and related training histories to provide training recommendations to improve outcomes. The computing system can use the maintenance plan and trained models to efficiently recommend revised safety protocols and allocate equipment, for example, by reserving or dispatching equipment for specific maintenance actions when the models predict that it will increase likelihood of success by at least a threshold amount.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram illustrating an example of a user interface for capturing scheduled maintenance data.

FIG. 4 is a diagram illustrating an example of a user interface to receive data indicating outcomes of maintenance.

FIG. 5 is a diagram illustrating an example of a user interface for entering injury data.

FIGS. 6A and 6B are diagrams illustrating an example of a user interface for entering near miss data.

Like reference numbers and designations in the various drawings indicate like elements.

DETAILED DESCRIPTION

A system can assist utilities and other service providers to improve the personnel safety and operational effectiveness of electric power grid maintenance. The system can train and use predictive models that can assess planned maintenance actions and take into account the conditions involved (e.g., weather, location, etc.). With the predictive models, the system can identify changes to the planned maintenance that will improve the outcome, e.g., by increasing likelihood of successful maintenance, reducing potential for injury or property damage, reducing the time required to conduct the maintenance, etc. The predictive models can be trained using records of previous maintenance actions carried out by the same utility, the same workers, and/or by other utilities and workers, allowing the models to predict the potential outcomes of future maintenance with a high degree of accuracy. The system can also generate and use mapping data that determines specific actions or changes to plans to address predicted outcomes or likelihoods indicated by the models. The mapping data, like the predictive models, can be learned and updated over time from maintenance records, to specify, with high accuracy, steps that will improve the success and safety of the actual maintenance actions performed. The system can also generate specific training recommendations based on injury, near-miss, training, and performance records related to workers to improve predicted outcomes or likelihoods indicated by the models. The predictive training models can be learned and updated over time from maintenance records across multiple utilities and other organizations to specify, with high accuracy, actions that will improve worker safety for scheduled maintenance actions.

Though described herein in the context of an electric power delivery system including an electric power grid, the disclosed systems and techniques can be applied to any of various utility systems, including municipal water systems, gas distribution systems, telecommunications systems, transit systems, or other systems of shared infrastructure.

Figure 1:
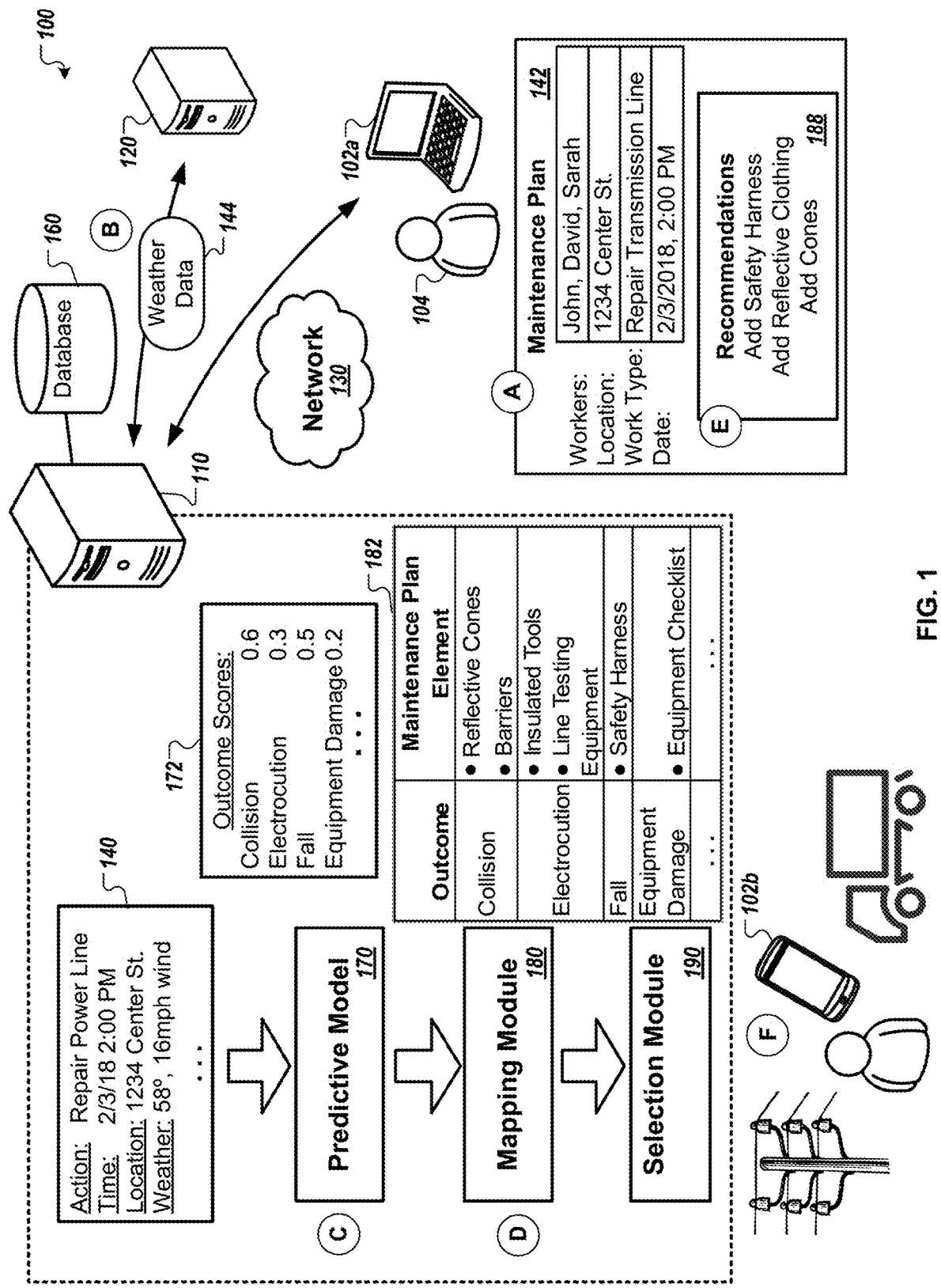
FIG. 1 is a diagram illustrating an example of a system using predictive models for electric power grid maintenance.

FIG. 1 is a block diagram that illustrates an example of a system 100 using predictive models for electric power grid maintenance. The system 100 includes a server 110, one or more client devices 102a, 102b, a database 160, one or more additional servers 120, and a network 130. In the example of FIG. 1, the server 110 uses a predictive model 170 and other elements of the system 100 to evaluate the potential outcomes of a future maintenance action for an electrical power grid. The server 110 then provides recommendations to improve the outcome of the planned maintenance, for example, by recommending equipment or changes to the maintenance plan to increase effectiveness, reduce safety and other risks, and otherwise enhance the scheduled maintenance action. Along with components of the system, FIG. 1 shows stages (A) through (F), which represent a flow of data.

The server 110 can represent one or multiple computer systems or server systems. In some implementations, the server 110 may be a cloud computing platform. The server 110 performs a number of functions, such as tracking and logging information about maintenance actions that are attempted, training predictive models, generating and serving maintenance plans, evaluating maintenance plans and providing enhancements and recommendations for the maintenance plans, and monitoring the performance of maintenance to ensure that plans are carried out effectively. These functions and others are discussed in more detail below.

The system 100 also includes one or more client devices 102a, 102b. Each client device 102a, 102b can be any of, for example, a desktop computer, a laptop computer, a cellular phone, a smart phone, a tablet computer, or other device. The client device 102a, 102b communicates with the server 110 to benefit from the predictions and other analysis that the server 110 generates. For example, a client device 102a, 102b may interact with the server 110 through an application local to the client device 102a, 102b, through an interactive web page provided by the server 110, through an application programming interface (API), or through other means. As a result, the client device 102a, 102b provides user interfaces for input of information from users (e.g., maintenance plans, job-site briefings, safety training data, near miss and incident reporting data) and outputs information (e.g., predictions, recommendations, safety reports, and notifications) provided by the server 110. Examples of user interfaces, which could be provided by an application or as a web page or interactive resource from the server 110, are shown in FIGS. 3-6. These user interfaces can be displayed on the client device 102a, enabling the user 104 to input information related to scheduled maintenance actions, historical maintenance actions, injuries, equipment damage, near-miss events, worker training, or other data.

In some implementations, the user 104 uses the client device 102a to navigate to a web page provided by the server 110. The user 104 may log-in with a user name and password, and, after the server 110 authenticates the user 104, the user 104 gains access to various functions of the web page or interface. For example, the user 104 may then create records of scheduled or completed (e.g., historical) maintenance actions, enter worker safety training data, view safety incident data, and request reports as discussed further below.

The system 100 also includes one or more servers 120. These servers 120 can be third-party servers that can provide various types of information relevant to past or future maintenance actions. For example, the servers 120 may provide geographic map data, weather data, database access, and so on.

The server 110 communicates with other elements of the system 100 through a communication network 130. The network 130 can be a combination of wired and/or wireless networks, and may include private networks and/or public networks, such as the Internet. In some implementations, the network 130 may include wide area data or cellular telephony networks.

Figure 5:
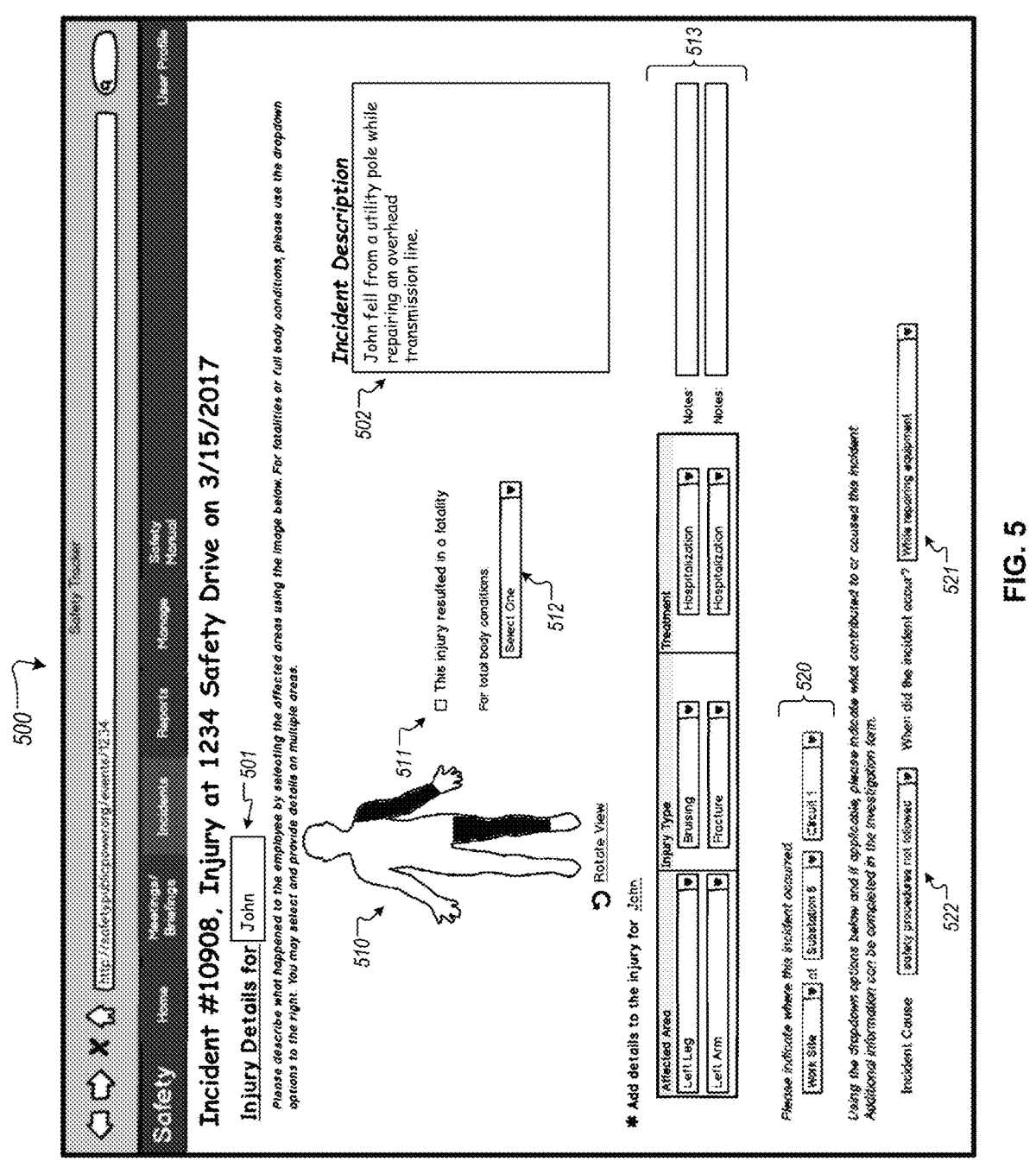

The server 110 has access to a database 160 that includes records describing previous maintenance actions that were attempted and/or completed. The records can be compiled from data from various client devices, such as the workers of various different electric power utilities. The maintenance data may include information describing the maintenance action (e.g., date, time, location, type of maintenance action, weather conditions, whether the maintenance action was successful, any problems encountered), the workers present, the electrical risks and hazards identified prior to starting work, as well as information describing any safety incidents, or property damage that may have occurred. For example, the data may include information about the hazards identified, a worker injury, equipment damage, a service outage, or a near-miss incident related to the maintenance action. Examples of user interfaces to facilitate reporting of outcomes of maintenance actions, including safety incidents, are shown in FIGS. 4-6.

The database 160 may be, for example, one or more data storage devices, a database server, or other data storage system. In some implementations, the server 110 stores maintenance records from multiple electric power utilities or from multiple geographic regions. The server 110 can process and analyze aggregate data from the multiple providers or regions to provide insight to electric power utilities beyond what could be determined from considering only the data of a single provider. Indeed, the maintenance history of any single utility may be limited and may not provide sufficient training data for generating a predictive model. Nevertheless, the combined maintenance history for multiple utilities and other third party organizations (e.g., subcontractors, municipal organizations, worker associations) may be used to provide predictions with better accuracy for all utilities. For example, the server 110 may process aggregate data to identify effective maintenance plan elements used by multiple electric power providers and to make recommendations to electric power utilities planning maintenance actions, or to provide safety-improving recommendations based on the work being performed and the hazards identified at the job-site or in the maintenance plan.

The server 110 may also store other information that is used to generate predictive models or to generate predictions using the predictive models. As an example, worker training data may be stored in the database 160. For example, the server 110 may store data indicating the various trainings (e.g., safety trainings, technical trainings, certificates, etc.) that workers of the power utility have received. The training data may indicate when the worker completed the training, any score received, and whether the training was approved by a supervisor. The worker safety data may also indicate when the training is due (e.g., a refresher course). In some implementations, the worker training data may indicate any particular skills or certifications (e.g., lineman certification) for a worker.

In some implementations, the server 110 receives additional data from the client device 102a or the server 120 describing aspects of past or future maintenance. For example, the server 110 may receive current, forecasted, or historical weather information from a server 120. In addition or as an alternative, client devices may determine conditions at the location of a maintenance action using their own sensors, and provide the information to the server 110. As another example, the server 110 may receive or store data related to the training (e.g., safety training, technical training) of workers of the electric power utility. The server 110 can use the additional data, along with maintenance data collected from one or multiple electric power utilities, for analyzing safety incidents, reporting trends, assessing the risk of scheduled maintenance actions, identifying potential safety hazards, and generating recommendations.

Still referring to FIG. 1, in stages (A) through (F), the server 110 receives input describing a future maintenance action, assesses the potential outcomes of the future maintenance action including safety risks, identifies maintenance plan elements that may improve the outcome of the maintenance action, and provides recommendations to the service provider to include the identified maintenance plan elements.

Figure 3:
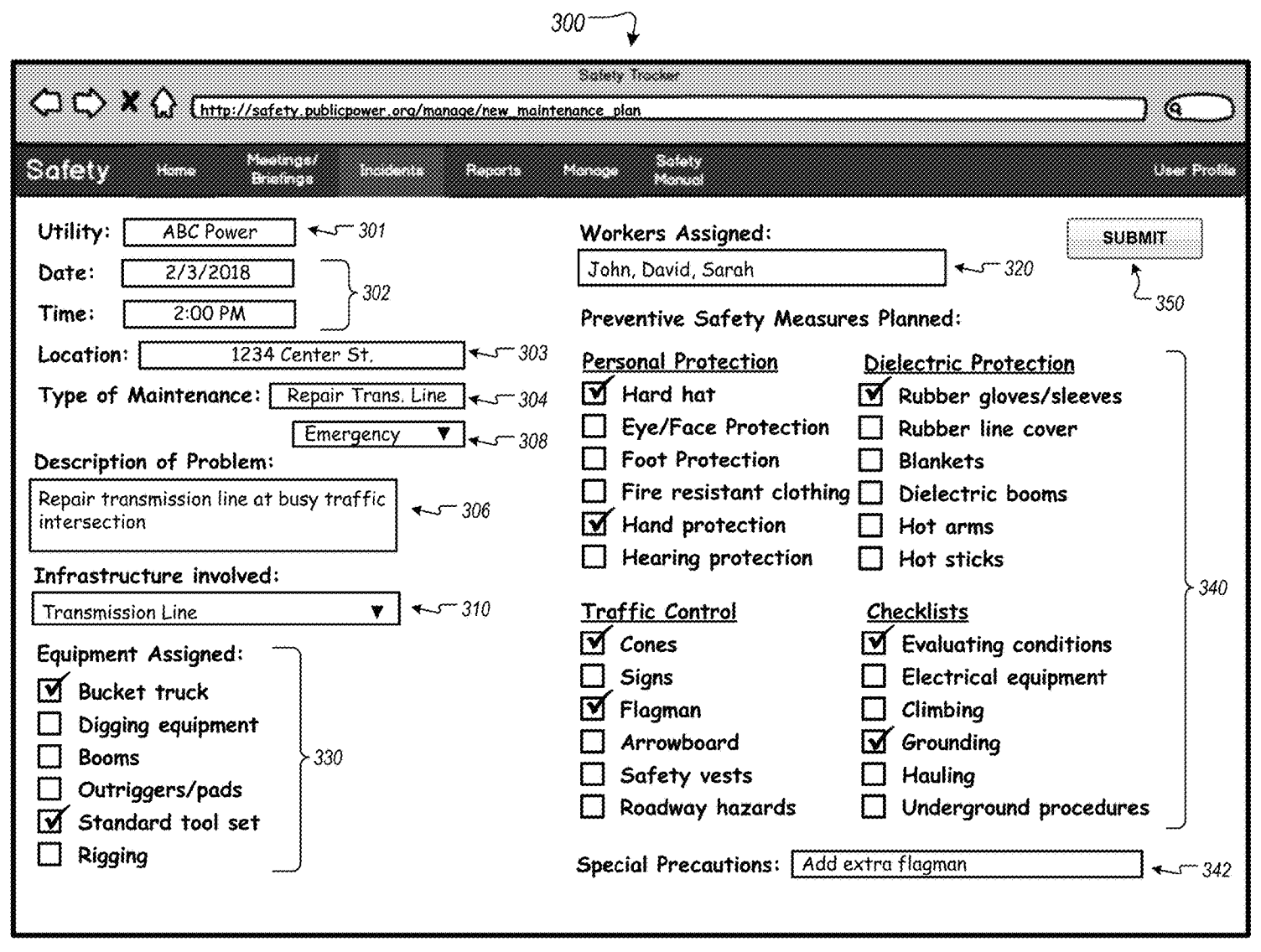

In stage (A), the server 110 receives, from the client device 102a, data describing a scheduled maintenance action. In some implementations, the data is provided by a user 104 through a user interface of the client device 102a for creating a maintenance plan 142. The user interface 142 can allow a user to enter a maintenance plan, and the server 110 can monitor the plan as it is entered and provide notifications, recommendations, and corrections as the plan is created by the user 104. An example of a user interface for entering maintenance plan data is shown in FIG. 3.

The maintenance plan 142 may include information about the electric power utility or service provider, the scheduled date and time of the maintenance action, the location, the type of maintenance (e.g., the particular repair to be performed), and whether it is a routine or emergency maintenance action. The maintenance plan 142 may also include information identifying the workers and equipment assigned to the maintenance action, as well as identified hazards, special precautions, and preventive safety measures planned for use, if any. In the example of FIG. 1, the maintenance plan 142 is for repairing a transmission line at 1234 Center St. on Feb. 3, 2018 at 2:00 PM, with the repair assigned to workers John, David, and Sarah.

In stage (B), the server 110 obtains, from a server 120, additional data related to the scheduled maintenance action. For example, the server 110 may request and receive weather data, traffic data, or physical data from the workers, 144 that can be used to indicate a forecast for the particular location, date, and time of the scheduled maintenance action.

In some implementations, the server 110 receives additional data from a client device 102b, which is with a worker who is performing the scheduled maintenance action. For example, the server 110 may receive location data (e.g., GPS coordinates) of the client device 102b that indicates the location of the scheduled maintenance action. In some implementations, the worker may send additional data to the server 110 through the client device 102b, including weather data or traffic conditions related to the scheduled maintenance action site.

In stage (C), the server 110 uses a trained predictive model 170 to assess the potential outcomes of the planned maintenance action. The predictive model 170 accepts input data 140, which may include information from the maintenance plan 142, as well as additional data, such as weather data 144, and provides an output indicating a predicted risk of the scheduled maintenance action. In some implementations, the predictive model 170 generates one or more outcome scores 172 indicating likelihoods of potential outcomes of the maintenance action. These outcomes may include, among others, success, failure, an expected time or time range to complete the maintenance, and various safety hazards. The hazards may be any of various events that potentially cause harm to person or property, including, but not limited to, electrocution, shock, fall, slip, trip, uneven ground, falling equipment, dust exposure, vibration, noise, temperature, vehicle collision, traffic hazards, excavation hazards, property damage, and equipment damage.

In some implementations, the predictive model 170 is developed using historical maintenance records stored in the database 160. As a result, the state of the predictive model 170 reflects a significant number of observations of outcomes of previous maintenance actions, both successful and unsuccessful. The maintenance records may include information describing the maintenance action performed (e.g., type of maintenance, location, date and time, workers assigned), the environmental conditions at the time of the maintenance action, the components of the maintenance plan and which components were actually used on-site, and safety incidents (including near-miss incidents) related to the maintenance action. In some instances, the maintenance records include safety training information associated with the workers assigned.

The predictive model 170 may be generated from records for a single electric power utility or from multiple power utilities, including subcontracting organizations, as well as state, local, and city organizations. By using data from a single utility, the predictive model 170 can be utility-specific, reflecting maintenance actions as typically performed by the particular utility. In some implementations, by using data from multiple power utilities and other organizations to develop the predictive model 170, the model's performance (e.g., accuracy, scope) can improve.

Based on the input data 140, the predictive model 170 may generate one or more outcome scores 172. The outcome scores 172 describe the relative likelihoods of one or more potential outcomes related to the scheduled maintenance action. In some implementations, the predictive model 170 generates one outcome score 172 for each potential outcome. In some implementations, the predictive model 170 generates one outcome score 172 for a combination of hazards (e.g., one outcome score for the combined hazard of electrocution and fall). In some implementations, the predictive model 170 generates a composite outcome score 172 that estimates the overall safety risk of the scheduled maintenance action.

In stage (D), the server 110 uses a mapping module 180 to determine the predicted effect of maintenance plan elements for reducing the safety risk of the scheduled maintenance action. In some implementations, the mapping module 180 accesses mapping data 182 which has been generated from analysis of the maintenance data in the database 160. The mapping data 182 specifies relationships between the effectiveness of maintenance plan elements in improving specific aspects of maintenance actions, e.g., effectiveness in increasing likelihoods of positive outcomes and/or decreasing the likelihoods of negative outcomes. For example, the mapping data 182 may indicate that wearing a reflective safety vest is highly effective for reducing the risk of a vehicle collision, but ineffective for reducing the risk of a fall. The mapping data 182 can be derived from the maintenance data 182 and be weighted according to the history of reports for the specific utility or even specific workers involved in the planned maintenance being assessed. In some examples, the mapping data can be used to generate training-based, inter-regional and cross-organizational relationships between maintenance plan elements and maintenance outcomes. Also, the mapping data can be incrementally updated over time as additional reports are obtained.

The maintenance plan elements may include types of equipment to use, techniques to use in carrying out the maintenance, contextual or incidental factors (e.g., changes to the planned time, date, travel route, order of steps to be performed, etc.), etc. Some of the maintenance plan elements can be precautions or preventive measures that may reduce the risk of potential harm to person or property. For example, the preventive measures may include one or more of personal protective equipment (e.g., hard hat, gloves or other hand protection, eye or face protection, boots or other foot protection, hearing protection, respirator), vehicle preventive measures (e.g., wheel chocks, other backing equipment), traffic control measures (e.g., cones, signs, illuminated arrowboard, having a flagman, wearing reflective safety vests), and dielectric devices (e.g., rubber gloves, rubber sleeves, rubber or plastic line covers, blankets, hot sticks, hot arms, hot hoists, dielectric booms). In some implementations, the preventive measures may include using checklists or procedures, for example, checklists for evaluating work conditions (e.g., check for uneven/muddy ground, slippery surfaces, etc.), equipment (e.g., verify voltage rating, ensure grounding, etc.), climbing readiness (e.g., ensure sound pole butt, check pole surface, etc.), electrical status of infrastructure (e.g., confirm hot or de-energized), or lock-out/tag-out procedures. In some implementations, the preventive measures may relate to the particular workers assigned to the maintenance action (e.g., a minimum or maximum number of workers assigned, at least one worker with a particular safety training or certification).

Based on the outcome scores 172 and the mapping data 182, the mapping module 180 provides an output indicating the predicted effect of various preventive measures for reducing the safety risk of the scheduled maintenance action. For example, the mapping module 180 may output maintenance plan element scores, where each score indicates a predicted effectiveness of a particular maintenance plan element for improving the outcome of the planned maintenance, e.g., reducing the safety risk of the scheduled maintenance action.

Using outcome scores 172 and effectiveness scores determined from the mapping data 180, the server 110 can select a subset of the possible maintenance plan elements that would most improve the outcome of the planned maintenance action. For example, a selection module 190 can determine combined scores for different maintenance plan elements. The combined score for a maintenance plan element can be, e.g., a sum of the products of (i) effectiveness scores for the element with respect to different outcomes, and (ii) the outcome scores indicating relative likelihoods of different outcomes.

In stage (E) of FIG. 1, based on the output of the mapping module 180, the server 110 generates recommendations 188. The recommendations 188 include maintenance plan elements that the server 110 determines may reduce the safety risk of the scheduled maintenance action. In the example of FIG. 1, the recommendations 188 including adding a safety harness, adding reflective clothing, and adding cones to the preventive measures planned for the scheduled maintenance action.

In stage (F), the server 110 provides the recommendations 188 to one or more client devices 102a, 102b. For example, the server 110 may send the recommendations 188 for display on a user interface of a client device 120b that is a smart phone, a tablet, or a laptop computer being used by a worker assigned to the scheduled maintenance action. In some implementations, the server 110 provides the recommendations 188 in advance of the scheduled maintenance action, for example, for use at a job-site briefing prior to beginning work. By providing the recommendations 188 in advance, the safety risk of the scheduled maintenance action can be reduced by incorporating the recommended plan elements 188 into the maintenance plan 108. In some implementations, the server 110 provides the recommendations 188 while the work is in progress. For example, the server 110 can generate updated recommendations 188 based on the actual conditions at the job-site (e.g., through data provided by workers or sensors at the job-site; updated weather, traffic, or other environmental data provided by server 120; or other new data related to the maintenance action provided to the server 110). The server 110 can provide the updated recommendations 188 to the client device 102a, 102b, allowing the workers to implement the recommendations 188 while the work is in progress to improve the likelihood of success and safety of the maintenance action.

As one example, the user 104 sends to the server 110 a maintenance plan 142 for a maintenance action to repair a malfunctioning transformer at a busy intersection. The server 110 further obtains predicted weather data 144 from the computer system 120 indicating that rain is forecast for the location of the repair on the scheduled date of the maintenance action. The server 110 may also obtain historical and predicted traffic data, as well as worker performance data, including the training level of the workers, for the organizations in the region and the utility performing the work. By using the predictive model 170, the server 110 generates outcome scores 172 indicating that there is a high risk of a vehicle collision at this particular intersection when it rains.

The server 110 accesses mapping data 182 that indicates reflective clothing, cones, and a flagman are effective measures for reducing the risk of vehicle collision. The mapping data 182 also indicates that a harness is not effective for reducing the risk of collision. As a result, the output of the mapping module 180 indicates that adding reflective clothing, cones, and a flagman are likely effective measures for reducing the safety risk of the scheduled maintenance action, while adding a second traffic control vehicle is likely not an effective measure. Based on the output of the mapping module 180, the server 110 sends recommendations 188 to the client device 102b suggesting that the repair crew add reflective clothing, cones, and a flagman to the preventive measures used for the scheduled maintenance action.

In some implementations, the maintenance plan 108 may include an indication of one or more planned preventive measures. Through the process described by stages (A) through (F), the server 110 can verify that suitable preventive measures for planned for the scheduled maintenance action and can recommend the inclusion of additional (or removal of extraneous) preventive measures to reduce the risk of the maintenance action.

In some implementations, the server 110 can analyze received or stored data to generate and provide reports as requested by the user 104. For example, the server 110 can generate reports describing safety incidents of an electric power utility. The reports can include any of various information about safety incidents, including types of incidents, related maintenance actions, associated environmental conditions, resulting injuries and/or damage, and maintenance plan elements (e.g., equipment or procedures) used or foregone. The reports can also include information on worker training. In some implementations, the reports may describe trends over time or relationships between data (e.g., between safety incidents and maintenance plan elements used, between safety and worker training). The reports can be generated from data from one electric power utility or from aggregate data of more than one utility.

Figure 2:
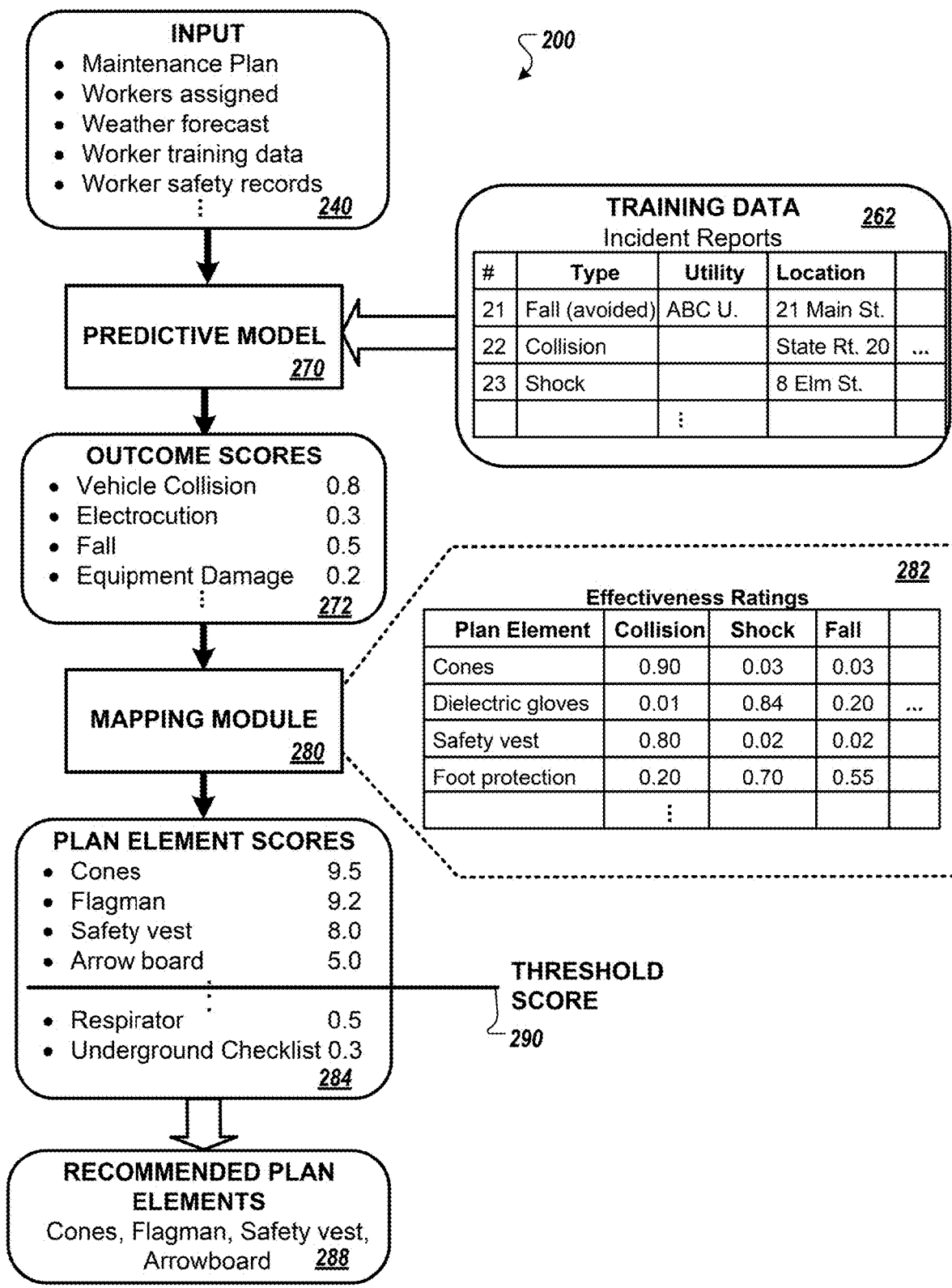
FIG. 2 is a block diagram illustrating the use of predictive models for electric power grid maintenance.

FIG. 2 is a block diagram illustrating an example of a method 200 for generating recommended maintenance plan elements. The method 200 can be implemented by one or more computer systems, for instance, the server 110, and describes more fully stages (C) through (E) of FIG. 1. The method 200 includes a predictive model 270 and a mapping module 280, which are used to generate outcome scores 284. Based on the outcome scores 284, the server 110 generates one or more recommended maintenance plan elements 288 for reducing the safety risk of a scheduled maintenance action.

The method 200 accepts input data 240 related to a scheduled maintenance action. The input data 240 may include information from the maintenance plan for the scheduled maintenance action, including the type of maintenance; the date, time, and location of the maintenance action; and the workers assigned. The input data 240 may also include a weather forecast related to the scheduled maintenance action, training data or safety records of the workers assigned to the maintenance action, a traffic report for the location, or other data related to the scheduled maintenance action.

The input data 240 is provided to a predictive model 270, which assesses the potential outcomes of the scheduled maintenance action. In some implementations, the predictive model 270 is developed based on records of previous, completed maintenance actions, for example, the historical maintenance records stored in the database 160. The records may describe maintenance actions of one or multiple electric power utilities in one or more geographic regions.

In some implementations, the predictive model 270 is a machine learning model that is trained to estimate the potential outcomes of a particular maintenance action. For example, the machine learning model may be trained to estimate the risk of one or more types of potential harm (e.g., safety hazards) resulting from a particular scheduled maintenance action using (i) maintenance plan information related to the scheduled maintenance action (ii) historical maintenance records that include safety incident reports and related environmental conditions and (iii) the identified or forecast environmental conditions (e.g., weather, traffic) for the scheduled maintenance action. The machine learning model may generate one or more outcome scores 272 associated with one or more safety hazards (e.g., one outcome score for each safety hazard), where the relative outcome scores 272 indicate the relative likelihood of the hazards occurring during, or as a result of, the scheduled maintenance action (e.g., a hazard with a outcome score of 0.9 is more likely to occur than a hazard with a outcome score of 0.6).

The machine learning model may be trained on a set of training data 262. The training data 262 includes historical maintenance records, as well as related safety incident reports. The training data 262 may also include other data associated with the maintenance actions or reported incidents, including weather reports, traffic reports, employee safety training data, or other data.

In some implementations, the training data 262 may include near-miss data records, where the near-miss records describe incidents in which injury or damage to person or property was closely averted.

Training can involve adjusting the parameters of a machine learning module that implements the predictive model 270. Training can also include training a machine learning model that includes an artificial neural network, a support vector machine, a decision tree, a regression model, a maximum entropy classifier, a set of statistical models, a model based on a genetic algorithm, or a model based on a clustering algorithm.

The machine learning model may use training data 262 from one power utility or from multiple power utilities or organizations. In some implementations, the machine learning model may use training data 262 from the particular utility or other organization to develop a utility-specific predictive model 270.

In some implementations, the machine learning model may train using data 262 aggregated from power utilities that operate within a specified geographic region, or data 262 aggregated from power utilities that share a particular set of common characteristics. For example, the model may train using data 262 aggregated from power utilities that have infrastructure of a certain age or type. By training on aggregate data 262 from multiple utilities, the resulting predictive model 270 may provide improve performance (e.g., greater accuracy, and encompass a broader set of use cases) than a predictive model 270 trained on data 262 from a single utility.

The predictive model 270 outputs one or more outcome scores 272 that indicate the risk of one or more safety hazards occurring during, or resulting from, the scheduled maintenance action. In some implementations, the predictive model 270 outputs one outcome score 272 for each analyzed safety hazard.

In some implementations, the outcome scores 272 are numeric values, where the relative value provides a measure of the relative likelihood of various potential harms (e.g., hazards). For example, the outcome scores 272 may be a decimal value between zero and one, where zero indicates low likelihood and one indicates high likelihood.

The outcome scores 272 depend on the input data for the particular scheduled maintenance action and may be different for scheduled maintenance actions of different types, locations, etc. For example, a scheduled maintenance action on an elevated transmission line, which requires a worker to use a bucket truck or helicopter to access the line, may have an outcome score 272 for a fall of 0.9 (i.e., high likelihood), while an maintenance action on underground equipment may have an outcome score 272 for a fall of 0.1 (i.e., low likelihood).

The potential severity of harm to person or property can depend on the particular hazard. A worker who falls from a bucket truck may be more severely injured than a worker who steps into an excavated hole. In some situations, the potential severity of harm may depend on a combination of particular hazards. For example, a worker who is electrocuted and falls from a bucket truck may be more severely injured than a worker who is electrocuted while standing on the ground. Likewise, the location of work site may influence the severity of harm. For example, a worker climbing a utility pole on a busy street may be more severely injured by a fall than a worker climbing a pole in an empty back lot.

In some implementations, the predictive model 270 may determine outcome scores 272 that reflect the severity of one or more safety hazards. For example, the outcome scores 272 may be weighted values determined based on both the likelihood of occurrence and the potential severity of harm resulting from a particular hazard or combination of hazards.

Based on the outcome scores 272, the server 110 uses a mapping module 280 to determine the predicted effect of various preventive measures for reducing the safety risk of the scheduled maintenance action. For example, the mapping module 280 may predict that adding cones and a flagman will significantly reduce the safety risk of a maintenance action performed along a busy roadway.

To determine the predicted effect of preventive measures, the mapping module 280 may access mapping data 282. In some implementations, the mapping data 282 is stored in a memory system of the server 110. The mapping data 282 correlates the effectiveness of maintenance plan elements for reducing the risk of one or more safety hazards.

In some implementations, the mapping data 282 is generated by analyzing historical maintenance records stored in the database 160. For example, the maintenance records may include information describing the maintenance action performed, the environmental conditions at the time of the maintenance action, the preventive measures used, and the safety incidents or near-miss incidents related to the particular maintenance action. By analyzing the records, the server 110 or other computer system can determine that using maintenance plan elements reduced the safety risk of a particular type of maintenance action in particular environmental conditions. For example, the server 110 may determine that using an illuminated arrowboard reduces the safety risk of roadside maintenance actions in rainy or foggy weather conditions.

In the example of FIG. 2, the mapping data 282 is a table that lists the predicted effectiveness of various preventive measures for various safety hazards, where the effectiveness is assigned a value ranging from zero (not effective) to one (very effective). The table indicates that cones are more effective for reducing the risk of vehicle collision (effectiveness of 0.9) than for reducing the risk of electrocution (effectiveness of 0.03). Conversely, dielectric gloves are more effective for reducing the risk of electrocution (effectiveness of 0.84) than for reducing the risk of fall (effectiveness of 0.20).

Based on the outcome scores 272 and the mapping data 282, the mapping module 280 provides an output indicating the predicted effect of various preventive measures for reducing the safety risk of the scheduled maintenance action. In some implementations, the mapping module 280 may generate one or more outcome scores 284, where each score indicates a predicted effectiveness of a particular preventive measure for reducing the safety risk of the scheduled maintenance action. In some implementations, the mapping module 280 may generate a plan element score 284 for a combination of more than one preventive measures (e.g., one score for the combination of a hard hat and gloves).

In the example of FIG. 2, each plan element score 284 is a value within the range of zero to ten, with higher values indicating a larger predicted effect for reducing the safety risk of the scheduled maintenance action. In this example, the preventive measures with the highest scores 284 (i.e., those predicted to reduce the risk of the maintenance action most) are measures relating to traffic control (e.g., cones, flagman, safety vest), reflecting the outcome scores 272, which indicate that a vehicle collision poses the greatest safety risk for this particular scheduled maintenance action.

In some implementations, the mapping module 280 may determine outcome scores 284 that reflect other constraints, such as the limited availability or cost the preventive measure. For some plan elements, such as the use of certain equipment, there may be limited numbers of items available at any one time. Similarly, there may be weight restrictions, cost restrictions, or other factors limiting the use of certain equipment or techniques. As another example, some plan elements may be mutually exclusive while others may find increased effectiveness or synergy in being used together. These relationships can be captured in the mapping data and the functions that the mapping module 280 applies to assign scores. For example, the outcome scores 284 may be weighted values determined both by the effectiveness of the measure for reducing the safety risk and the cost of the element. As an example, without considering cost, the mapping module 280 may determine the plan element score 284 of erecting additional barricades for reducing the safety risk of a roadside maintenance action is 0.6. Because the cost of additional barricades is inexpensive, when considering both effectiveness and cost, the mapping module 280 may determine the plan element score 284 of erecting additional barricades is increased to 0.7.

Based on the outcome scores 284, the server 110 generates one or more recommended maintenance plan elements 288 to improve the outcome of the maintenance action. In some implementations, the server 110 generates the recommended measures 288 by evaluating the outcome scores 284 with respect to a threshold score 290. For example, the server 110 may determine that any recommendation with a plan element score 284 greater than the threshold score 290 is a recommended preventive measure 288. In other implementations, a different number or set of plan elements may be selected. For example, recommendations may be limited to a predetermined maximum number of elements, so that no more than the maximum number (e.g., 3, 5, 10, etc.) are selected. The server 110 can then provide the recommended maintenance plan elements 288 to a user, for example, for display on a client device through a user interface. The recommended plan elements 288 can be incorporated into the maintenance plan for a maintenance action that is planned (e.g., for a job-site briefing) or in progress.

As another example, the server 110 can evaluate the likelihoods of different outcomes after including the element in the maintenance plan, to determine whether the change sufficiently improves the outcome probabilities. This may be done using the effectiveness scores as an estimate of the change that would occur, with multiple plan elements potentially all contributing to improve likelihood of success and reduce specific risks. The server 110 may identify a combination of items that adjusts outcome likelihoods, e.g., increases likelihoods of a successful completion or decreases risks, to a desired predetermined level. For example, the server 110 can continue adding maintenance plan elements to the recommended set, starting with those of greatest effectiveness for the risks or conditions present, until the server 110 estimates that there is at least an 80% likelihood of successful repair and less than a 5% likelihood of serious injury. The specific thresholds can be set individually for each different outcome assessed by the predictive models. In addition, to generate the outcome likelihoods with recommended changes reflected, the predictive models can be used again to generate outcome scores, this time with the planned data plus the identified new plan elements recommended by the server 110.

In the example of FIG. 2, the server 110 selects the recommended maintenance plan elements 288 of cones, a flagman, wearing safety vests, and using an arrowboard because their outcome scores 284 are greater than the threshold score 290. The server 110 may take various actions to cause these elements to be presented to a user and/or recorded in a maintenance plan. In some cases, selected plan elements may be added automatically, while in other cases the elements are provided over a network for display to a user, for the user's approval. When appropriate, the server 110 can reserve or dispatch resources (e.g., equipment, personnel, etc.) for time and location of the planned maintenance action.

FIG. 3 is a diagram illustrating an example of a user interface 300 for entering scheduled maintenance data. The data entered into the user interface 300 may, for example, correspond to the maintenance plan 108 of FIG. 1. The user interface 300 allows a user or computer system to create a record for a new scheduled maintenance action and send the information to the server 110. In some implementations, the user may be a utility worker, in an office or out in the field, who reports a new scheduled maintenance action. The server 110 of FIG. 1 may provide the user interface 300 to one of the client devices 102a as a web page or other resource. Information input to the user interface 300 may be transmitted to the server 110 for processing and storage. In some implementations, after the scheduled maintenance action has been performed, the maintenance data can be stored and used to train or generate a predictive model.

The user interface 300 includes various fields and controls for inputting data related to the scheduled maintenance action. For example, the interface 300 includes fields to input the utility company 301 performing the maintenance, the date and time 302 of the scheduled maintenance action and the location 303 (e.g., address, GPS coordinates) of the maintenance action. The interface also includes fields to input the type of maintenance 304 and a description of the problem to be addressed 306. In some implementations, the interface 300 may include a drop-down menu 308 indicating whether the maintenance action is routine or emergency maintenance. The interface 300 can include controls allowing the user to select the type of infrastructure involved 310 (e.g., transmission line, transformer, sub-station, etc.).

The interface 300 also includes fields and controls allowing the user to indicate the resources planned for the scheduled maintenance action. For example, the interface 300 can include a field to indicate the workers assigned 320 to the scheduled maintenance action. The interface 300 can also include controls for the user to select the equipment assigned 330 to the maintenance action (e.g., trucks, digging equipment, booms, outriggers, tools, rigging, electrical equipment, test equipment, electrical meters, etc.).

The interface 300 also can include controls allowing the user to indicate the planned preventive safety measures 340 for the scheduled maintenance action. The planned preventive safety measures 340 may include personal protective equipment, dielectric protection, traffic control, and checklists, as shown. The planned preventive safety measures 340 may also include other measures not shown, including vehicle protective measures, training requirements, or other preventive safety measures available to the work crew. The interface 300 can include a field for inputting any special precautions 342 planned for this particular scheduled maintenance action.

In some implementations, the interface 300 can include safety hazard checklist, where a user can indicate known or anticipated safety hazards related to the scheduled maintenance action. The hazard checklist may include, for example, crew information (e.g., required trainings, certifications, first aid qualifications), personal positioning considerations (e.g., possibility of being struck by, caught in-between, under a load, falling from; potential for electrical contact; lifting methods used), work area conditions (e.g., uneven ground, muddy ground, slippery surfaces), electrical hazards (e.g., high voltage, hot or energized lines, clearance, open neutrals, opening loads, availability of fault current, static/induced voltage, energized static conductors), grounding hazards, hauling hazards (e.g., load security, load dimension, load capacity, braking capacity, lighting), wire stringing hazards (e.g., stringing over, stringing adjacent to, guarding, swivels, grips, catch-offs, presses), excavation hazards, and traffic hazards (e.g., pedestrians, vehicle traffic, obstructed views).

The interface 300 can also include fields for indicating permitting or notice requirements or other special conditions or circumstances related to the scheduled maintenance action.

When the user or computer system has input the data related to the scheduled maintenance action, the user can submit the information to the server 110, for example, by clicking the button 350 or otherwise interacting with the user interface 300.

In some implementations, data related to the scheduled maintenance action is sent to the server 110 from one or more sensors. For example, an environmental sensor (e.g., temperature sensor, humidity sensor, air quality sensor) at the job-site can send environmental data related to the maintenance action to the server 110. In some cases, the user can send to the server 110 worker health data from a wearable sensor worn by a worker performing the maintenance action. The server 110 can use the received sensor data to generate updates to the predictive models and/or recommended preventive measures in real-time or near real-time. The data related to the maintenance action may be stored by the server 110 and used to schedule resources, analyze maintenance actions, generate safety recommendations, and provide reports or other information.

FIG. 4 is a diagram illustrating an example of a user interface 400 for entering safety incident data. The user interface 400 allows a user or computer system to create a record for a new safety incident related to a maintenance action. The server 110 may provide the user interface 400 to a user as a webpage or other resource to enable reporting of one or more safety incidents. Information input to the user interface 400 may be transmitted to the server 110 for processing and storage, for example, the information may be saved as a record in the database 160. The safety-related incident information, hazard information, precautionary actions, and maintenance outcomes may be used to train or generate a predictive model.

The user interface 400 includes various fields and controls for inputting data related to the safety incident event. For example, the interface 400 includes fields to input the utility company 401 involved in the incident, the date and time 402 the event occurred and the date and time 403 the event was reported. The interface 400 can also include fields to input the location 404 of the incident event and the type of maintenance 405 associated with the incident. In some implementations, the server 110 automatically assigns an incident number 406 to a newly created incident record. In some implementations, the server 110 associates the incident data input to the interface 400 with maintenance data (e.g., the maintenance plan) of the related maintenance action.

The user interface 400 can also include one or more fields for inputting environmental conditions 410 when the incident occurred. For example, the interface 400 can allow the user to choose to use or import weather data from a weather database (e.g., NOAA data). The interface 400 can also allow the user to input directly weather information (e.g., temperature, precipitation, wind speed), for example, through fields or drop-down menus.

In some implementations, the user interface 400 can allow the user to create, edit, view, or remove one or more records associated with the safety incident. For example, the interface 400 can display a table 420 listing various records associated with the safety incident. The records can describe particular instances of harm (e.g., an injury, a fatality, property damage, equipment damage) or potential harm (e.g., a near-miss) that occurred in connection to the safety incident. The records also can describe an investigation or other report of the incident. The interface 400 can include hyperlinks that provide the user access to the selected report when, for example, the user clicks on an edit icon. Examples of user interfaces for entering, viewing, and editing various record data associated with an incident or a worker are shown in FIGS. 5-9.

FIG. 5 is a diagram illustrating an example of a user interface 500 for entering injury data. The user interface 500 allows a user or computer system to create a record of an injury that occurred during, or resulting from, a safety incident. The server 110 may provide the user interface 500 to a user, for example, when the user clicks on a hyperlink when entering incident data (e.g., a hyperlink in interface 400 described above). Information input to the user interface 500 may be transmitted to the server 110 for processing and storage. In some implementations, the information may be saved as a record in the database 160.

The user interface 500 includes various fields and controls for inputting data related to an injury that occurred in connection with a safety incident. The interface 500 can include fields for indicating the person injured 501 and a description of the incident 502. The person injured 501 could be, for example, a utility worker injured while performing a maintenance action.

The user interface 500 can also allow the user to indicate one or more physical injuries that the person suffered. For example, the interface 500 can include a rendering 510 depicting a human form. The user may interact with the rendering 510 to indicate the location of the injuries the person suffered. For example, a user can click on the left leg of the rendering 510 to indicate that the person suffered an injury to his left leg. In some implementations, the interface 500 may change the appearance (e.g., change color) of the portion of the rendering 510 indicated to highlight the location of the injury. In some implementations, the rendering 510 may be rotated by the user through a control, providing access to other locations (e.g., the back or front side) of the body. The interface 500 can also include a control for indicating a fatality 511, as well as a field for indicating one or more conditions that affected the entire body 512.

In some implementations, when the user indicates a location of injury, the interface 500 can display fields prompting the user to enter injury information 513. For instance, the user can enter information relating to the injury type (e.g., fracture, bruising, sprain, burn, laceration), the treatment (e.g., on-site first aid, hospitalization, no treatment), or other notes. Some implementations can aggregate injury data, which the server 110 can use in conjunction with other data to improve the predictive models for preventive measure recommendations based on the maintenance plan data (e.g., maintenance work type, location, conditions). For example, based on aggregate injury data, the server 110 can identify maintenance actions with a particularly high frequency of hand injury and provide recommendations to increase use of personal protective equipment (e.g., gloves) and require additional relevant safety training.

The interface 500 can also include fields or controls allowing the user to enter information about the incident that led to the injury, for example, fields or drop-down menus indicating where the incident occurred 520 (e.g., work site, office, particular sub-station and circuit), when during the maintenance action the incident occurred 521 (e.g., en route to the worksite, during the repair, after the repair), and any contributing factors 522 (e.g., safety procedures not followed, adverse weather, insufficient training).

FIGS. 6A and 6B are diagrams illustrating examples of user interfaces 600a and 600b, respectively, for entering near-miss data. The user interfaces 600a, 600b allow a user or computer system to create a record of a near-miss incident that occurred in connection to a safety incident. A near-miss incident can be an event during which no harm to person or property occurred, but where harm was closely averted. In some examples, interfaces 600a, 600b comprise a display provided to a user by the server 110, for example, when the user clicks on a hyperlink when entering incident data (e.g., a hyperlink in interface 400 described above). Information input to the user interfaces 600a, 600b may be transmitted to the server 110 for processing and storage. In some implementations, the information may be saved as a record in the database 160 and used to train or generate a predictive model.

The user interfaces 600a, 600b include various fields and menus for inputting information related to a near-miss incident. The user interface 600a can include fields for entering the date and time of the event 601, as well as the date and time the event was reported 602. It can include fields indicating the worker(s) nearly affected 603, the location of the incident 604, and weather proper safety precautions or preventive measures were used 605.

The interface 600b can include fields allowing the user to enter information describing the near-miss incident. For example, the interface 600b can include a sentence generator 620 with various drop-down menus that allow the user to select elements that create a sentence describing the near-miss incident. In the sentence generator 620 of FIG. 6B, the user can select elements from drop-down menus to describe what happened in the near-miss incident, how it happened, and where it occurred. The interface 600b can also include a field 630 allowing the user to enter other notes and data related to the near-miss incident.

Figure 7:
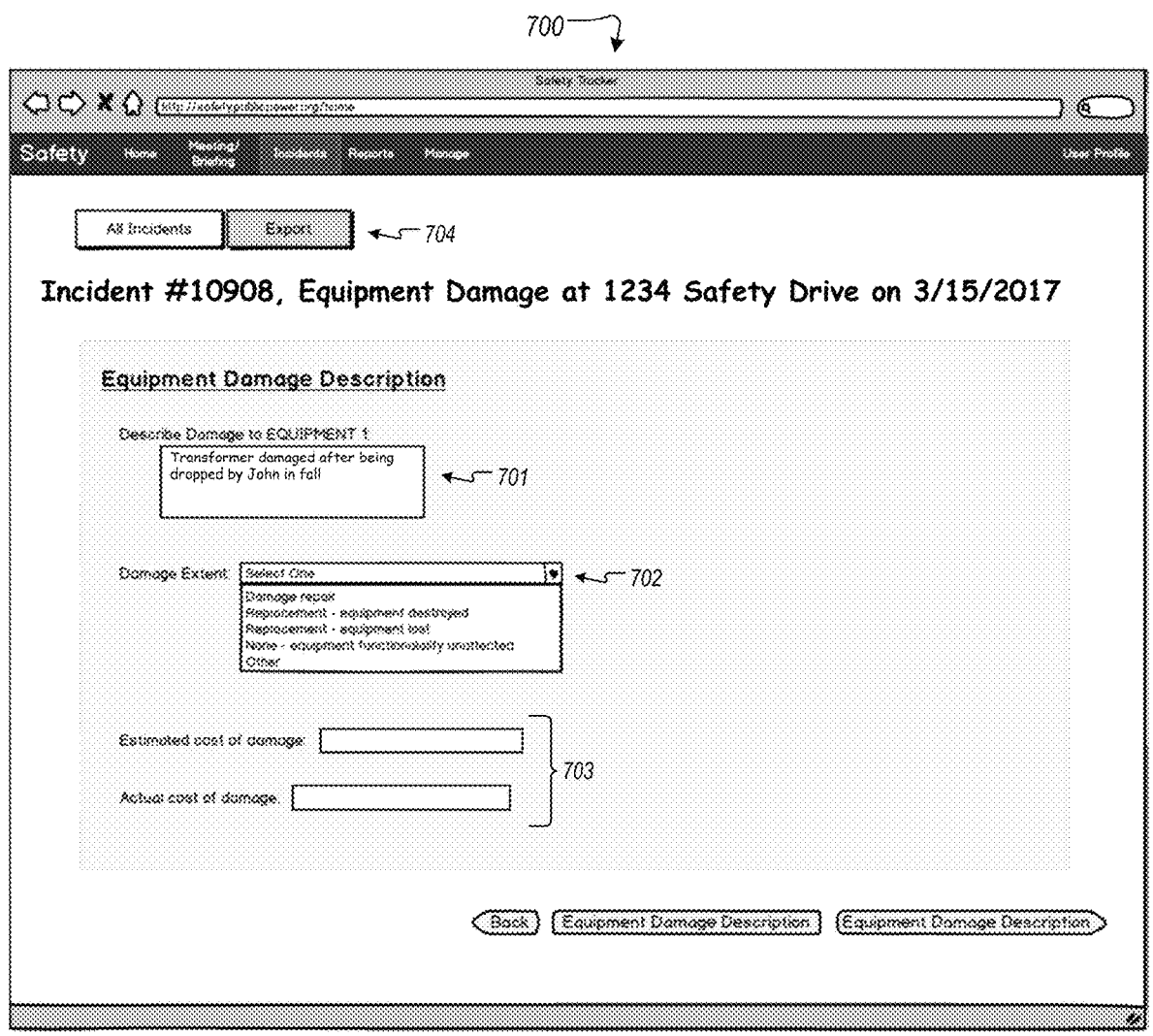
FIG. 7 is a diagram illustrating an example of a user interface for entering equipment damage data.

FIG. 7 is a diagram illustrating an example of a user interface 700 for entering equipment damage data. The user interface 700 allows a user or computer system to create a record of equipment or property damage that occurred during, or resulted from, a safety incident. The server 110 may provide the user interface 700 to a user, for example, when the user clicks on a hyperlink when entering incident data (e.g., a hyperlink in interface 400 described above). Information input to the user interface 700 may be transmitted to the server 110 for processing and storage. In some implementations, the information may be saved as a record in the database 160 and used to train or generate one or more predictive models.

The user interface 700 includes various fields for entering information related to equipment or property damage related to a safety incident. The example interface 700 includes a field 701 for entering a text description of the damage that occurred, as well as a selectable field 702 indicating the extent of damage. The interface 700 can include additional fields 703 for indicating other attributes of the damage, for example, the estimated and actual cost of the damage. In some implementations, the interface 700 allows the user to export the data related to the equipment damage for one or multiple incident records, for instance, by selecting a control 704.

Figure 8:
FIG. 8 is a diagram illustrating an example of a user interface for entering worker training data.

FIG. 8 is a diagram illustrating an example of a user interface 800 for entering worker training data. The user interface 800 allows a user or computer system to create a record of the training and capabilities (e.g., certifications, past performance, skill level) of a particular worker. The server 110 may, for example, provide the user interface 800 to a user as a webpage or other resource. Information input to the user interface 800 may be transmitted to the server 110 for processing and storage. In some implementations, the information may be saved as a record in the database 160 and used to train or generate one or more predictive models.

The user interface 800 includes various controls and fields for entering information related to a worker's training and capabilities. The example interface 800 includes two training entries for worker "John." The entries include fields 801a, 801b for indicating the training or capability of the worker, as well as various fields 802a, 802b for indicating attributes of the training, such as the date the training was completed, the organization conducting the training, and supervisory approval of the training. The interface 800 can also include any of various information related to a worker's performance, including certifications, levels of skill, specialized experience, or any history of past safety incidents.

Figure 9:
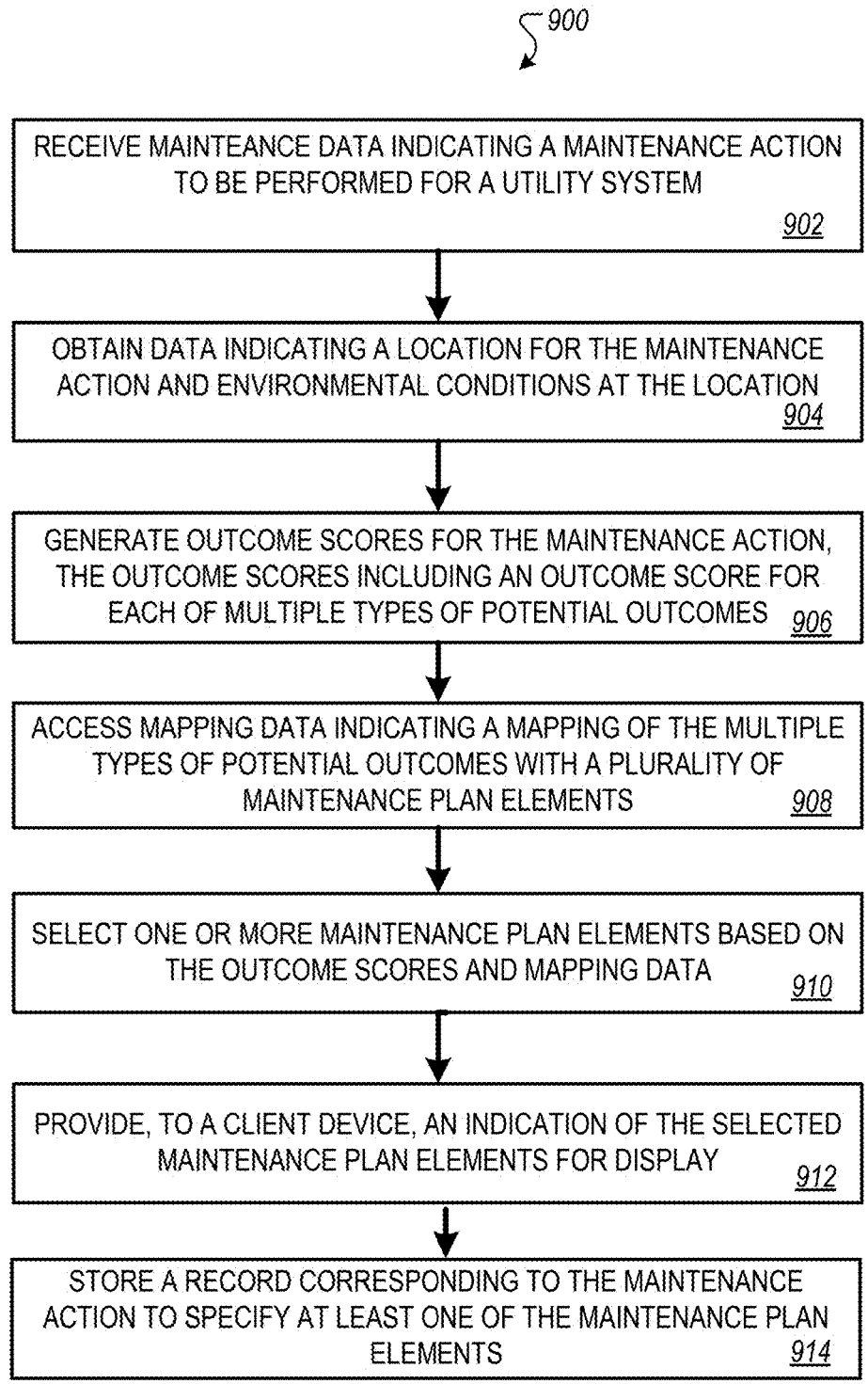
FIG. 9 is a flowchart illustrating an example of a method for using predictive models for utility system maintenance.

FIG. 9 is flowchart illustrating an example of a method 900 for using predictive models for utility system maintenance. The method 900 can be performed by one or more computer systems, for example, a server or computer system such as the server 110. Briefly, the method 900 includes receiving maintenance data indicating a maintenance action to be performed for utility system (902), obtaining data indicating a location for the maintenance action and environmental conditions at the location (904), generating outcome scores for the maintenance action, the outcome scores including an outcome score for each of multiple types of potential outcomes of the maintenance action (906), accessing mapping data indicating a mapping of the multiple types of potential outcomes with a plurality of maintenance plan elements (908), selecting one or more maintenance plan elements based on the outcome scores and the mapping data (910), providing to a client device an indication of the selected maintenance plan elements for display (912), and storing a record corresponding to the maintenance action to specify at least one of the maintenance plan elements (914).

In more detail, in method 900, the server receives maintenance data indicating a maintenance action to be performed for a utility system (902). The utility system can be, for example, an electric power delivery system (e.g., an electric power grid), a municipal water system, a gas distribution system, a telecommunications system, a transit system (e.g., a road or rail network), or another system relating to shared infrastructure. The maintenance action can be, for example, an inspection, a repair, a replacement, an upgrade, or other routine or emergency maintenance action. The maintenance data received by the server can include, for example, a date and time of the maintenance action to be performed, a location for the action, a type of maintenance action (e.g., a particular inspection or repair, or a malfunction or disruption to be addressed), a technique for carrying out the maintenance action, a piece of equipment, a tool to be used for the action, or one or more workers assigned to perform the maintenance action. For example, the maintenance data can indicates that the maintenance action involves repair or replacement of equipment at a generation station, a substation, a distribution line, a transmission line, a metering site, an underground vault, or an underground line.

In some examples, the maintenance data indicates a health status of a particular worker. For example, the maintenance data may indicate a temperature, respiration rate, or other indication of the particular worker's physical health. In some examples, the data indicating the health status of the worker can be received from a health sensor or monitor worn by the particular worker.

In some implementations, the maintenance is input by a user, for example, through client device 102a, 102b. For example, the server can provide, over the communication network, data for an interactive user interface to receive maintenance plan information. The interactive user interface can include input controls for specifying characteristics of planned maintenance including a location for the maintenance action, a type of maintenance to be performed, a particular worker assigned to perform the maintenance action, and a technique for carrying out the maintenance action. The server can then receive, over the communication network, maintenance data that indicates characteristics of a planned maintenance action indicated through user input to the input controls of the interactive user interface.

The server also obtains data indicating (i) a location for the maintenance action and (ii) environmental conditions at the location (904). In some examples, the data indicating a location and/or the environmental conditions is included in the received maintenance data. In some examples, the server obtains some or all of the data from another source, e.g., from another server system. For example, the server can obtain location data that includes a geographic map or GPS coordinates for a location for the maintenance action. The server can obtain data indicating environmental conditions that indicate the current weather at the location, or the forecasted weather for the location at a scheduled or expected time for the maintenance action (e.g., through a weather database). The server can also obtain data indicating traffic conditions, air quality, or other environmental conditions. In some implementations, the server obtains data from the other source through the Internet or other communications network.

The server generates outcome scores for the maintenance action using a model generated from records for maintenance (906). The outcome scores can include an outcome score for each of multiple types of potential outcomes of the maintenance action, where the outcomes can include, for example, the success or failure of the action, an expected time or time range to complete the maintenance, and various safety hazards. The hazards can be any of various events that potentially cause harm to person or property, including, but not limited to, electrocution, shock, fall, slip, trip, uneven ground, falling equipment, dust exposure, vibration, noise, temperature, vehicle collision, traffic hazards, excavation hazards, property damage, and equipment damage.

In some implementations, the outcome score indicate a likelihood of a potential outcome of the maintenance action. For example, the multiple outcome scores may each indicate a likelihood of a different type of accident or type of harm to equipment or people given a type of maintenance to be performed, the location for the maintenance action, and the environmental conditions of the location.

In some examples, an outcome score may be a numeric score. In some examples, an outcome score may be one of a predetermined set of scores (e.g., "high," "low," "very low").

In some implementations, the server provides, for display by the client device, an indication of the one or more types of harm determined to be most likely according to the outcome scores.

The server generates outcome scores using a model generated from records for maintenance. In some examples, the records for maintenance relate to maintenance performed by multiple utilities, at least one of which serves a geographic region that includes the location for the maintenance action. One or more of the utilities can be, for example, an electric power utility or another utility company (e.g., a water company, a gas distribution company, a contractor or subcontractor, a municipal organization or agency, or another organization that services a utility system).

In some implementations, the model is generated from a database including (i) reports of injuries or damage occurring due to maintenance of utility systems, and (ii) reports of near miss events that did not result in injury or damage but had the potential to cause injury or damage.

In some implementations, the model is a machine learning classifier trained based on records of harm resulting from maintenance performed for a utility associated with the maintenance action and one or more other utilities in a particular geographic region. For example, the machine learning classifier can include one or more of a neural network, a maximum entropy classifier, a decision tree, a support vector machine, a regression model, or a log-linear model. The server can provide data indicating a maintenance type, the location for the maintenance action, and the environmental conditions as input to the machine learning classifier, and generate the outcome scores based on the outputs of the machine learning classifier.

In some implementations, the maintenance data identifies a particular worker assigned to perform the maintenance action. The server can retrieve information indicating a training level of the particular worker, an incident history of the particular worker, or a health status of the particular worker and generate outcome scores based on the worker's training level, incident history, or health status. In some examples, the worker's health status may be determined based on health data received by the server from a sensor or health monitor worn by the particular worker. The health data can reflect, for example, the physical fitness of the particular worker while on the job-site. In some examples, the server can generate outcome scores based on maintenance data from similarly situated (e.g., similar training level, similar incident history, or similar health status) workers.

In some implementations, the server generates the outcome scores for the maintenance action based on data indicating one or more of: a malfunction or disruption of the utility system to be addressed with the maintenance action, equipment of the utility system involved in the maintenance action, a tool used to perform the maintenance action; an indication of a planned technique for carrying out the maintenance action, an identifier for a utility associated with the utility system, an identifier for a worker associated with the maintenance action, or a level of training of a worker associated with the maintenance action.

The method 900 includes accessing mapping data indicating a mapping of the multiple types of potential outcomes with a plurality of maintenance plan elements, where the maintenance plan elements include multiple different types of equipment and multiple different procedures (908). For example, the maintenance plan elements can include a change in personnel for performing the maintenance action, a change in time to perform the maintenance action, a technique for performing the action, a tool to use to perform the action, or safety equipment to use in performing the maintenance action. The maintenance plan elements can also include other equipment to use in performing the action (e.g., a particular truck, device), procedures, preventive measures (e.g., worker training), a particular worker to assign to perform the maintenance action, the training level of the particular worker, the skill level of the particular worker, or other aspects of the maintenance action.

The mapping data can include data that specifies relationships between the effectiveness of maintenance plan elements in improving one or more potential outcomes of the maintenance action. In some examples, the mapping data is derived from maintenance data, e.g., from records of maintenance. The mapping data can be updated over time as additional maintenance data, reports, and records are obtained. The mapping data can be based on maintenance data from one utility, or from multiple utilities, e.g., multiple utilities in a particular geographic region.

Based on the outcome scores generated using the model and the mapping data, the server selects one or more maintenance plan elements (910). For example, the server may select one or more maintenance plan elements using a threshold score (e.g., select one or more elements whose outcome score is greater than a threshold score). In some examples, the selected elements may be limited to a predetermined maximum number of elements. In some examples, the server selects maintenance plan elements based on the cost or availability of a particular maintenance plan element. In some examples, the maintenance plan elements can be selected to improve the likelihood of one or more desired outcomes of the maintenance action (e.g., improved safety, efficiency, cost-effectiveness).

The server also provides, to a client device over a communication network, an indication of the selected one or more maintenance plan elements for display on a user interface of the client device (912). For example, the server can provide a recommendation, for display on the interactive user interface for entering the maintenance plan, to add the selected one or more maintenance plan elements to the maintenance plan. In some examples, the server automatically adds the elements to the maintenance plan.

In some implementations, the server also accesses data identifying one or more client devices associated with workers carrying out the maintenance action and determines that a particular client device of the one or more client devices is located at the location for the maintenance action. The server can then provide data causing a recommendation for the one or more maintenance plan elements to be output by the particular client device while the client device is located at the location for the maintenance action.

The method 900 also includes storing a record corresponding to the maintenance action to specify at least one of the one or more maintenance plan elements (914).

In some implementations, after storing the record indicating the maintenance plan, the server determines that environmental conditions associated with the location for the maintenance action have changed and generates additional outcome scores based on data indicating the changed environmental conditions. The server can alter the maintenance plan based on the additional outcome scores and the mapping data and provide a notification of the alteration to the maintenance plan to a client device of a person associated with the maintenance plan.

In some implementations, based on the outcome scores, the server selects equipment for carrying out the maintenance action based on the outcome scores, reserves or dispatches the selected equipment, and updates the stored record corresponding to the maintenance plan to indicate that reservation or dispatch of the selected equipment.

In some implementations, the method 900 also includes the server providing interface data for an interactive reporting interface for reporting an incident. The interactive reporting interface can include a representation of a body of a person, where the representation has areas that are selectable by a user to indicate locations of injury to a person. The server can receive, over the communication network, report data entered through the interactive reporting interface, where the report data describes an accident involving harm to a person and indicates a selected portion of the representation of the body. The server can store the report data in a database of incident data describing injuries associated with a plurality of electrical power utilities and using the report data to generate or update the model for generating outcome scores.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or other monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, a social networking platform, rather than an external application, may perform employment analysis and provide employment information to users of the social networking platform. Accordingly, other implementations are within the scope of the following claims.

What is claimed is:

1. A method performed by one or more computers, the method comprising:
   training, by the one or more computers, a machine learning classifier to predict likelihoods of different types of harm potentially resulting from utility maintenance, wherein the machine learning classifier is trained based on records of harm resulting from maintenance performed for one or more utilities;
   providing, by the one or more computers, user interface data for a user interface for creating a maintenance plan for a portion of a utility system;
   receiving, by the one or more computers, input through the user interface indicating a maintenance action as part of the maintenance plan and a location for the maintenance action;
   generating, by the one or more computers, one or more outcome scores for the maintenance action using the trained machine learning classifier, the one or more outcome scores each indicating a likelihood that a corresponding type of harm will occur due to performing the maintenance action, the one or more outcome scores being generated by the trained machine learning classifier based on the maintenance action and the location;
   accessing, by the one or more computers, effectiveness scores that respectively indicate effectiveness of maintenance plan elements in reducing a likelihood of occurrence of the types of harms corresponding to the one or more outcome scores, wherein the maintenance plan elements include multiple different types of equipment for performing the maintenance action and multiple different procedures for performing the maintenance action;

selecting, by the one or more computers, one or more maintenance plan elements from among a plurality of maintenance plan elements, the one or more maintenance plan elements being selected based on (i) the one or more outcome scores that indicate likelihoods that the different types of harm that will occur due to performing the maintenance action and (ii) the effectiveness scores that indicate effectiveness of the maintenance plan elements in reducing the likelihood of occurrence of the types of harms corresponding to the one or more outcome scores; and providing, by the one or more computers and for display in the user interface, a recommendation for the one or more maintenance plan elements selected based on the one or more outcome scores and the effectiveness scores.

2. The method of claim 1, comprising obtaining, by the one or more computers, data indicating (i) a location for the maintenance action and (ii) environmental conditions for the location;

wherein the one or more outcome scores are based at least in part on the location and the environmental conditions.

3. The method of claim 1, wherein the machine learning classifier comprises at least one of a neural network, a maximum entropy classifier, a decision tree, a support vector machine, a regression model, or a log-linear model.

4. The method of claim 1, wherein the user interface is configured to receive maintenance plan information, the user interface comprising input controls for specifying characteristics of planned maintenance including at least one of a location for the maintenance action, a type of maintenance to be performed, a particular worker assigned to perform the maintenance action, or a technique for carrying out the maintenance action; and wherein receiving the input through the user interface comprises receiving, over a communication network, maintenance data indicating characteristics of a planned future maintenance action indicated through user input to the input controls of the user interface.

5. The method of claim 4, wherein providing the recommendation for the selected one or more maintenance plan elements comprises providing a recommendation, for display on the user interface, to add the selected one or more maintenance plan elements to the maintenance plan.

6. The method of claim 1, further comprising:

accessing data identifying one or more client devices associated with one or more workers assigned to carry out the maintenance action;

determining that a particular client device of the one or more client devices is located at the location for the maintenance action; and providing data causing a recommendation for the one or more maintenance plan elements to be output by the particular client device, while the particular client device is located at the location, in response to determining that the particular client device of the one or more client devices is located at the location for the maintenance action.

7. The method of claim 1, wherein generating the one or more outcome scores for the maintenance action is further based on data indicating one or more of:

a malfunction or disruption of the utility system to be addressed with the maintenance action;

equipment of the utility system involved in the maintenance action;

a tool used to perform the maintenance action;

an indication of a planned technique for carrying out the maintenance action;

an identifier for a utility associated with the utility system;

an identifier for a worker associated with the maintenance action; or a level of training of a worker associated with the maintenance action.

8. The method of claim 1, wherein generating the one or more outcome scores comprises generating multiple one or more outcome scores that each indicate a likelihood of a different type of accident or type of harm to equipment or people.

9. The method of claim 1, further comprising providing, for display in the user interface, an indication of one or more types of harm determined to be most likely according to the one or more outcome scores.

10. The method of claim 1, wherein the maintenance plan identifies a particular worker assigned to perform the maintenance action;

wherein the method comprises retrieving information about the particular worker; and wherein the one or more outcome scores are generated based on the information about the particular worker.

11. The method of claim 10, wherein the information about the particular worker comprises information indicating a training level of the particular worker, an incident history of the particular worker, or a health status of the particular worker.

12. The method of claim 1, wherein the maintenance action involves repair or replacement of equipment at a generation station, a substation, a distribution line, a transmission line, a metering site, an underground vault, or an underground line.

13. The method of claim 1, wherein the one or more outcome scores are generated based in part on weather data indicating current weather at the location or forecasted weather for the location at a scheduled or expected time for the maintenance action.

14. The method of claim 1, wherein the maintenance plan elements comprise at least one of:

a change in personnel for performing the maintenance action;

a change in a time to perform the maintenance action;

a technique for performing the maintenance action;

a tool to use to perform the maintenance action; or safety equipment to use in performing the maintenance action.

15. The method of claim 1, wherein the trained machine learning classifier has been trained based on (i) reports of injuries or damage occurring due to maintenance of utility systems, and (ii) reports of near miss events that did not result in injury or damage but had potential to cause injury or damage.

16. The method of claim 1, comprising:

determining that environmental conditions associated with the location for the maintenance action have changed;

generating additional one or more outcome scores based on data indicating the changed environmental conditions;

altering the maintenance plan based on the additional one or more outcome scores and the effectiveness scores; and providing a notification of the alteration to the maintenance plan to a client device of a person associated with the maintenance plan.

17. The method of claim 1, comprising:
selecting equipment for carrying out the maintenance action based on the one or more outcome scores; and
reserving or dispatching the selected equipment for carrying out the maintenance action and updating a record corresponding to the maintenance plan to indicate that reservation or dispatch of the selected equipment.

18. The method of claim 1, comprising:
determining, by the one or more computers, that a client device has reached the location for the maintenance action; and
in response to determining that the client device has reached the location for the maintenance action, providing, by the one or more computers, data to the client device over a communication network to cause the client device to display at least one of the selected one or more maintenance plan elements on a user interface of the client device while the particular client device is located at the location for the maintenance action.

19. The method of claim 1, comprising:
monitoring, by the one or more computers, maintenance at the location for the maintenance action based on data received during maintenance at the location;
initiating, by the one or more computers, an interaction between a device present at the location and a user of the device in response to a determination by the one or more computers determining, based on the monitoring, that at least one of:
a particular step in the maintenance plan is reached;
a piece of equipment or a step of the maintenance plan is omitted; or
safety equipment selected does not match a type of work for the location.

20. The method of claim 1, comprising automatically adapting, by the one or more computers, a maintenance plan for the location in response to a detected change in conditions at the location.

21. A system comprising:
one or more computers; and
one or more computer-readable media storing instructions that, when executed by the one or more computers, cause the one or more computers to perform maintenance actions comprising:
training, by the one or more computers, a machine learning classifier to predict likelihoods of different types of harm potentially resulting from utility maintenance, wherein the machine learning classifier is trained based on records of harm resulting from maintenance performed for one or more utilities;
providing, by the one or more computers, user interface data for a user interface for creating a maintenance plan for a portion of a utility system;
receiving, by the one or more computers, input through the user interface indicating a maintenance action as part of the maintenance plan and a location for the maintenance action;
generating, by the one or more computers, one or more outcome scores for the maintenance action using the trained machine learning classifier, the one or more outcome scores each indicating a likelihood that a corresponding type of harm will occur due to performing the maintenance action, the one or more outcome scores being generated by the trained machine learning classifier based on the maintenance action and the location;
accessing, by the one or more computers, effectiveness scores that respectively indicate effectiveness of maintenance plan elements in reducing a likelihood of occurrence of the types of harms corresponding to the one or more outcome scores, wherein the maintenance plan elements include multiple different types of equipment for performing the maintenance action and multiple different procedures for performing the maintenance action;
selecting, by the one or more computers, one or more maintenance plan elements from among a plurality of maintenance plan elements, the one or more maintenance plan elements being selected based on (i) the one or more outcome scores that indicate likelihoods that the different types of harm that will occur due to performing the maintenance action and (ii) the effectiveness scores that indicate effectiveness of the maintenance plan elements in reducing the likelihood of occurrence of the types of harms corresponding to the one or more outcome scores; and
providing, by the one or more computers and for display in the user interface, a recommendation for the one or more maintenance plan elements selected based on the one or more outcome scores and the effectiveness scores.

22. One or more non-transitory computer-readable media storing instructions that, when executed by one or more computers, cause the one or more computers to perform maintenance actions comprising:
training, by the one or more computers, a machine learning classifier to predict likelihoods of different types of harm potentially resulting from utility maintenance, wherein the machine learning classifier is trained based on records of harm resulting from maintenance performed for one or more utilities;
providing, by the one or more computers, user interface data for a user interface for creating a maintenance plan for a portion of a utility system;
receiving, by the one or more computers, input through the user interface indicating a maintenance action as part of the maintenance plan and a location for the maintenance action;
generating, by the one or more computers, one or more outcome scores for the maintenance action using the trained machine learning classifier, the one or more outcome scores each indicating a likelihood that a corresponding type of harm will occur due to performing the maintenance action, the one or more outcome scores being generated by the trained machine learning classifier based on the maintenance action and the location;
accessing, by the one or more computers, effectiveness scores that respectively indicate effectiveness of maintenance plan elements in reducing a likelihood of occurrence of the types of harms corresponding to the one or more outcome scores, wherein the maintenance plan elements include multiple different types of equipment for performing the maintenance action and multiple different procedures for performing the maintenance action;
selecting, by the one or more computers, one or more maintenance plan elements from among a plurality of maintenance plan elements, the one or more maintenance plan elements being selected based on (i) the one or more outcome scores that indicate likelihoods that the different types of harm that will occur due to performing the maintenance action and (ii) the effectiveness scores that indicate effectiveness of the maintenance plan elements in reducing the likelihood of occurrence of the types of harms corresponding to the one or more outcome scores; and providing, by the one or more computers and for display in the user interface, a recommendation for the one or more maintenance plan elements selected based on the one or more outcome scores and the effectiveness scores.

\* \* \* \* \*

UNITED STATES PATENT AND TRADEMARK OFFICE
CERTIFICATE OF CORRECTION

PATENT NO. : 10,977,593 B1  
APPLICATION NO. : 16/601519  
DATED : April 13, 2021  
INVENTOR(S) : Alexander Hofmann and Michael John Hyland Page 1 of 1

It is certified that error appears in the above-identified patent and that said Letters Patent is hereby corrected as shown below:

On the Title Page

Item [56], Column 2, Line 2, delete "Retreived" and insert -- Retrieved --, therefor.

In the Specification

Column 1, Line 8, delete "Mar. 15, 2019," and insert -- Mar. 15, 2018, --, therefor.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*